(12) United States Patent
Lambri et al.

(10) Patent No.: US 8,807,262 B2
(45) Date of Patent: Aug. 19, 2014

(54) FOUR-WHEELED VEHICLE

(75) Inventors: Marco Lambri, Pontedera (IT); Luca Marano, Pontedera (IT); Davide Fabio Scotti, Pontedera (IT)

(73) Assignee: Piaggio & C.S.P.A., Pontedera (Pisa) (IT)

( * ) Notice: Subject to any disclaimer, the term of this patent is extended or adjusted under 35 U.S.C. 154(b) by 32 days.

(21) Appl. No.: 13/511,113

(22) PCT Filed: Oct. 27, 2010

(86) PCT No.: PCT/IB2010/002761
§ 371 (c)(1),
(2), (4) Date: Aug. 8, 2012

(87) PCT Pub. No.: WO2011/061585
PCT Pub. Date: May 26, 2011

(65) Prior Publication Data
US 2012/0305327 A1    Dec. 6, 2012

(30) Foreign Application Priority Data

Nov. 23, 2009    (IT) .............................. MI2009A2054

(51) Int. Cl.
*B60K 1/00*    (2006.01)
*B60G 11/08*    (2006.01)

(52) U.S. Cl.
USPC ........................................ 180/299; 180/312

(58) Field of Classification Search
USPC ......... 180/55, 56, 58, 59, 295, 299, 300, 312, 180/908, 291
See application file for complete search history.

(56) References Cited

U.S. PATENT DOCUMENTS

| 4,425,976 A | 1/1984 | Kimura |
| 4,773,675 A * | 9/1988 | Kosuge .................... 280/781 |
| 5,538,309 A | 7/1996 | Murray |

(Continued)

FOREIGN PATENT DOCUMENTS

| EP | 0136714 A2 | 4/1985 |
| EP | 2110877 A1 | 10/2009 |

(Continued)

OTHER PUBLICATIONS

International Search Report dated May 31, 2012.
Written Opinion of the International Searching Authority.

*Primary Examiner* — John Walters
*Assistant Examiner* — Brian Swenson
(74) *Attorney, Agent, or Firm* — Hedman & Costigan, P.C.; James V. Costigan; Kathleen A. Cositgan

(57) ABSTRACT

A vehicle (10) having a bearing frame (12) of the tubular trestle type, two front steered wheels (14, 16), two rear wheels (18, 20) with fixed axis (144), an engine unit (22), steering means (24), a front suspension unit (26), connecting the frame (12) to the front wheels (14, 16), a rear suspension unit (28), connecting the frame (12) to the rear wheels (18, 20), a transmission unit, interposed between the engine unit (22) and the axle shafts of the rear wheels (18, 20), a seat (44) for the driver of the vehicle (10), arranged at a central position with respect to such vehicle (10), and at least two seats (44') for the passengers of the vehicle (10) adjacent to each other, arranged laterally and receded according to a predefined distance with respect to the seat (44) for the driver of the vehicle (10).

23 Claims, 19 Drawing Sheets

(56) References Cited

U.S. PATENT DOCUMENTS

| | | | |
|---|---|---|---|
| 5,899,498 A | 5/1999 | Horton | |
| 5,915,495 A * | 6/1999 | Kerlin et al. | 180/291 |
| 5,918,692 A * | 7/1999 | Sekita et al. | 180/56 |
| 6,581,713 B2 * | 6/2003 | Fu et al. | 180/291 |
| 7,287,769 B2 * | 10/2007 | Thiemke et al. | 280/124.109 |
| 7,559,116 B2 * | 7/2009 | Hulbert et al. | 16/366 |
| 7,600,769 B2 * | 10/2009 | Bessho et al. | 280/124.109 |
| 2006/0254835 A1 | 11/2006 | Reffitt | |
| 2009/0091101 A1 | 4/2009 | Leonard et al. | |

FOREIGN PATENT DOCUMENTS

| | | |
|---|---|---|
| FR | 2684606 A1 | 6/1993 |
| GB | 1224196 A | 3/1971 |
| GB | 208792 A | 6/1982 |
| GB | 2088796 A | 6/1982 |
| JP | 57090273 A | 6/1982 |
| JP | 5-278425 A | 10/1993 |
| JP | 2008-149823 A | 7/2008 |
| WO | 2008115461 A2 | 9/2008 |
| WO | 2011083233 A1 | 7/2011 |

* cited by examiner

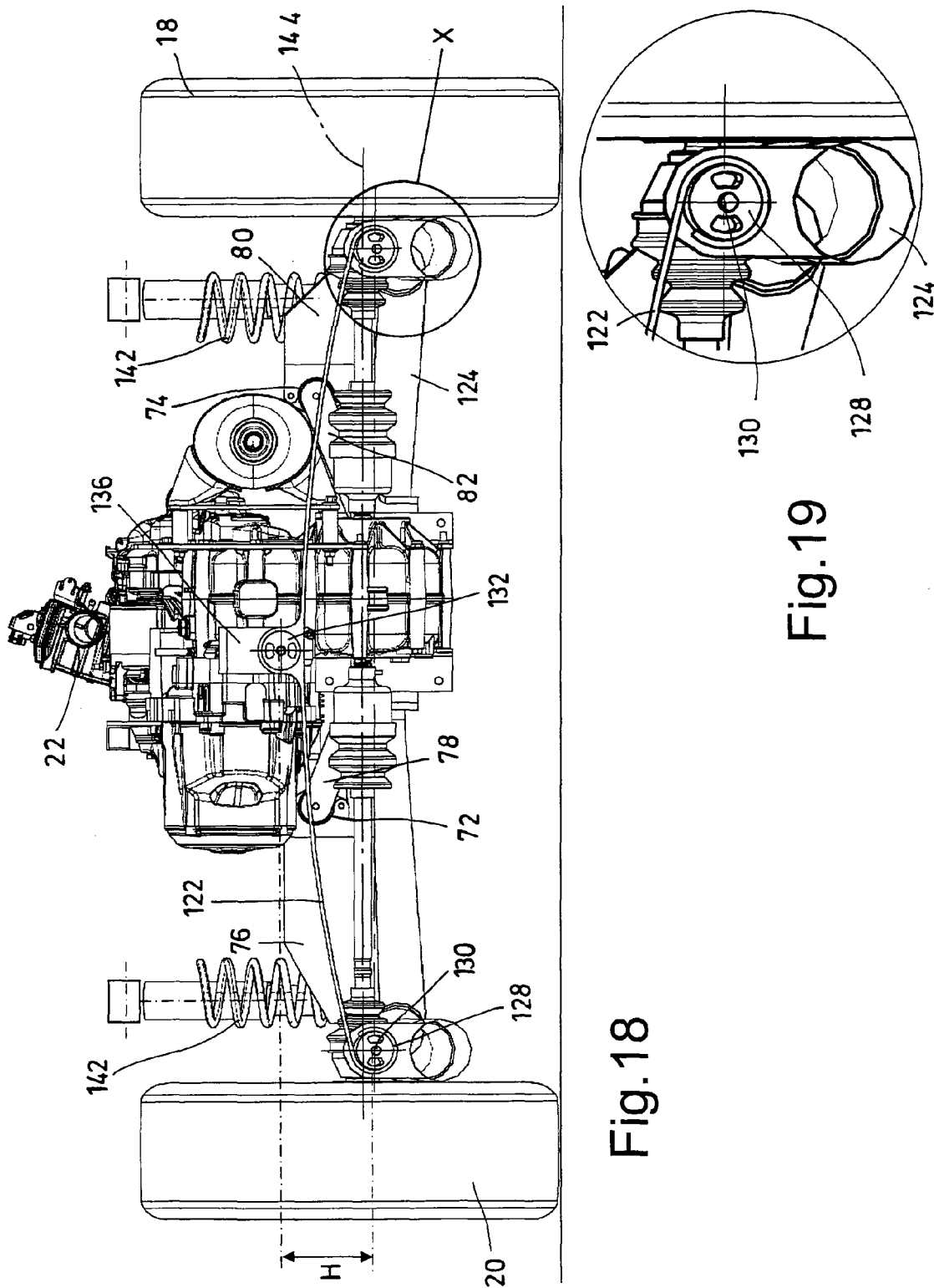

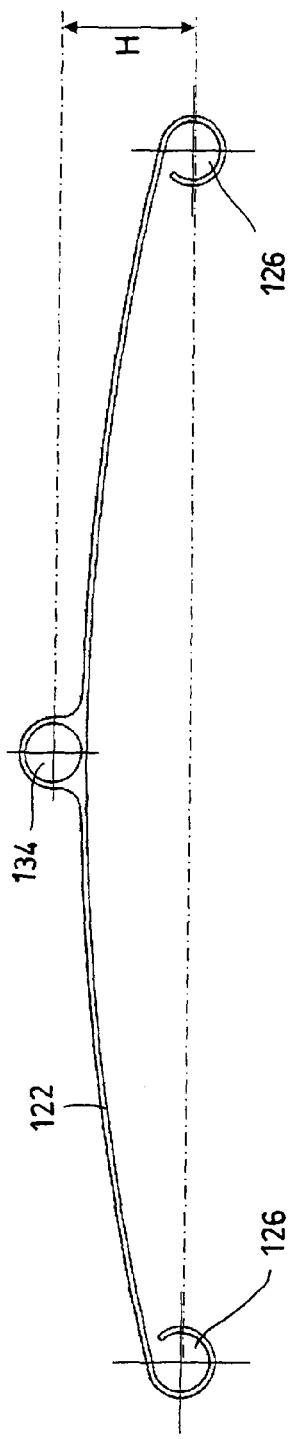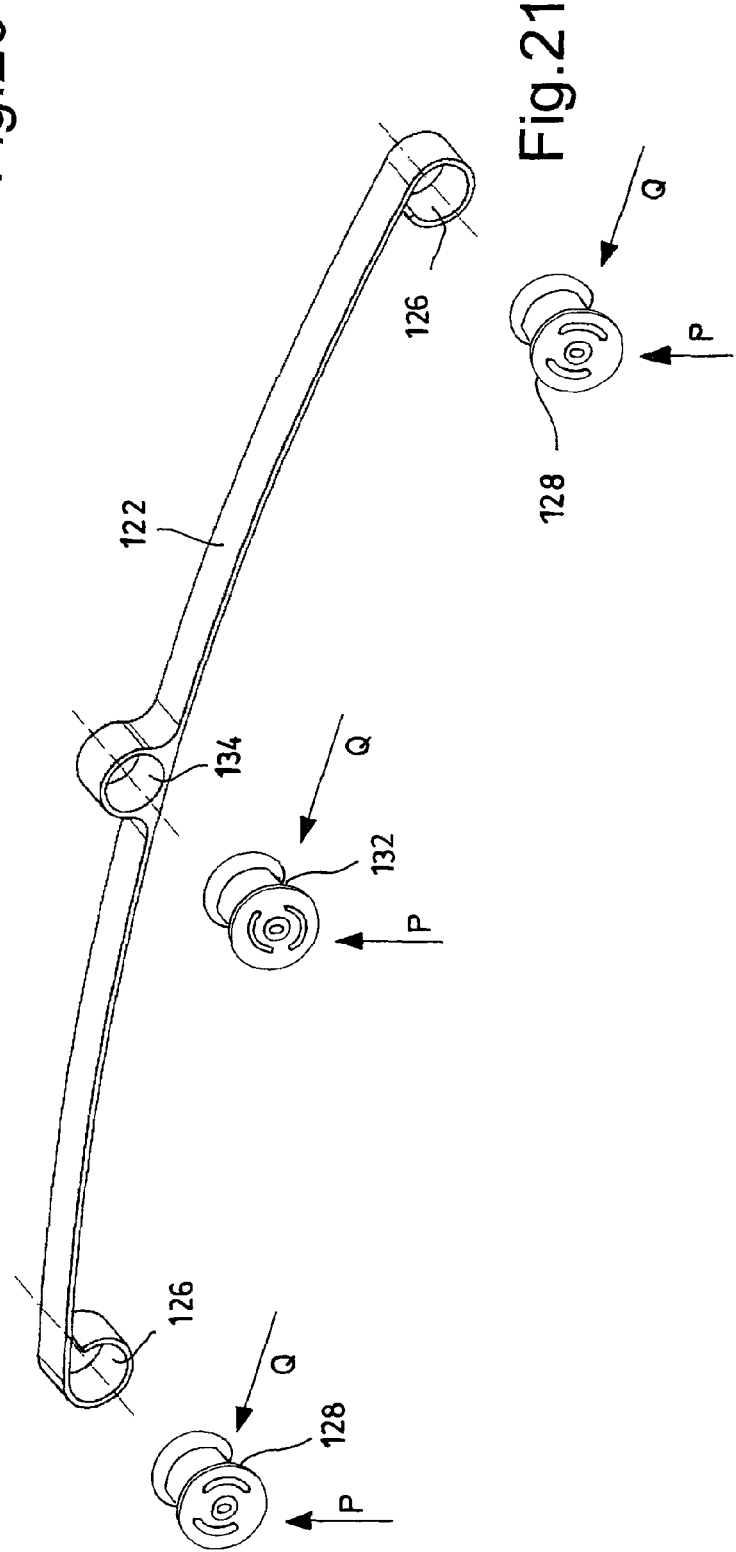

FOUR-WHEELED VEHICLE

The present invention refers to a four-wheeled vehicle, in particular a four-wheeled vehicle falling within the class of the so-called (heavy) "quadricycles".

According to the Framework Directive 2002/24/EC, the expression "light quadricycles" is used to indicate the four-wheeled motor vehicles whose unladen mass is lower or equivalent to 350 kg, not including the mass of the batteries in case electric vehicles, and whose maximum design speed is lower or equivalent to 45 Km/h. Depending on the type of engine, light quadrcycles must also meet the following conditions:

engine cylinder equivalent or lower than 50 $cm^3$ for spark ignition engines; or maximum net power output lower or equivalent to 4 KW in the case of other internal combustion engines; or maximum continuous rated power lower or equivalent to 4 KW in the case of electric motors.

Such light quadricycles meet the technical requirements applicable to the three-wheel mopeds, unless specified differently by a particular directive.

Vehicles whose unladen mass is lower or equivalent to 400 Kg (550 Kg for vehicles intended for carrying goods), not including the mass of the batteries for the electric vehicles and whose maximum net engine power is lower or equivalent to 15 KW are also defined as (heavy) "quadricycles". Such vehicles are considered as motor tricycles and they meet the technical requirements applicable thereto, unless differently specified by a particular directive.

The maximum number of people transportable by a quadricycle is usually equivalent to three units excluding the driver, though most of the currently available quadricycles are provided with only two seats.

In practice, quadricycles represent a valid alternative to the common automobiles not only for people not allowed to drive the automobiles themselves, but also and especially due to the compact features thereof, the fact that they are easy to use and low costs of the same, which make them particularly suitable for short distance urban transport needs. Quadricycles are usually much shorter and narrower than any automobile, also with respect to the so-called "citycars", thus being particularly manoeuvrable in the city traffic and both easy to drive and park.

On the other hand, the main disadvantage of the quadricycles currently available on the market also lies in their overall dimensions. Actually, given the small dimensions in terms of length, most currently available quadricycles suitable for transporting people may carry two people at most (including the driver). Furthermore, actually due to the small dimensions in length, the driver and passenger of the quadricycle, who usually seat adjacent to each other, have little room for the legs, such space being even more restricted by the overall dimensions represented by the front wheelhouses inside the cabin.

In addition, the small width of the quadricycles is a source of discomfort for the occupants thereof, who are forced to use seats usually quite narrow and uncomfortable, as well as very close to each other and to the lateral walls of the cabin, with ensuing difficulty to move the arms. The small overall dimensions of the body of the quadricycles may also create difficulties when entering the vehicle.

The current need to reduce the overall dimensions and weights leads to manufacturing vehicles whose frames have a mass more and more similar to that of the engines they are equipped with. This is particularly evident in vehicles belonging to the category of quadricycles, for which the directives require extremely strict mass limits. In this context, it is difficult to insulate the vibrations generated by the engines, with particular reference to those of the single- or multi-cylinder internal combustion type. Such vibrations are transmitted from the engine to the structure of the vehicle through the means for supporting the engine itself. All attempts to improve the filtering of such support means end up conflicting with the unfavourable relation between the mass of the vehicle and that of the engine, thus reaching an inherent physical limit which jeopardizes the final result, with harsh consequences as regards with comfort and safety of the occupants, alongside considerable stresses on all mechanical structures of the vehicle itself.

The constant increase of the number of circulating vehicles always raises the problem of parking, thus increasing the extension and the areas intended for parking vehicles has become an issue of vital importance. However, especially in high traffic density urban areas, there particularly arises the need of optimising the available spaces, searching for solutions allowing, on the contrary, reducing the dimensions of the single parking areas so as to allow the storage of a greater number of vehicles considering the same extension of the overall area occupied. This entails an increasing difficulty of access for the driver and the passengers into the vehicles, in that such vehicles are parked more and more closer to each other.

Thus, an object of the present invention is that of providing a four-wheeled vehicle, in particular a quadricycle, capable of overcoming the aforementioned drawbacks of the prior art in an extremely simple, inexpensive and particularly functional manner.

In particular, an object of the present invention is that of providing a four-wheeled vehicle which is extremely small in terms of dimensions and weight, simultaneously being capable of accommodating, in a comfortable and functional manner, at least three people including the driver.

Another object of the present invention is that of providing a four-wheeled vehicle capable of providing adequate guarantees in terms of safety and structural resistance.

A further object of the invention is that of providing a four-wheeled vehicle capable of directly transferring most of the stresses generated by the engine unit thereof to the wheels, so as to reduce the stresses that are usually transmitted to the frame thus improving the comfort level for the occupants.

Still another object is that of providing a four-wheeled vehicle capable of reducing the transverse space required to enter and exit from the vehicle itself, with evident advantages in terms of use in urban centres and park possibilities.

Lastly, another object of the invention is that of providing a four-wheeled vehicle capable of offering functionalities and characteristics suitable to meet short distance urban transport needs, representing a valid alternative both for motorcycles and automobiles and combining the advantages of the former (agility, manoeuvrability, easy to use) with those of the latter (comfort and safety).

These objects according to the present invention are attained by providing a four-wheeled vehicle, in particular a quadricycle, as outlined in claim 1.

Further characteristics of the invention are highlighted by the dependent claims, which form an integral part of the present description.

Characteristics and advantages of a four-wheeled vehicle, in particular a quadricycle, according to the present invention shall be clearer from the description that follows, provided by way of non-limiting example, with reference to the attached schematic drawings, wherein:

FIGS. 16, 17 and 18 are further detailed views, respectively top, side and rear, of the engine unit and of the rear suspension unit of a four-wheeled vehicle according to the invention;

FIG. 19 is a detailed view of the detail indicated with X in FIG. 18; and

FIGS. 20 and 21 show, respectively in side and exploded view, some components of the rear suspension unit of a four-wheeled vehicle according to the invention.

Figure 1:
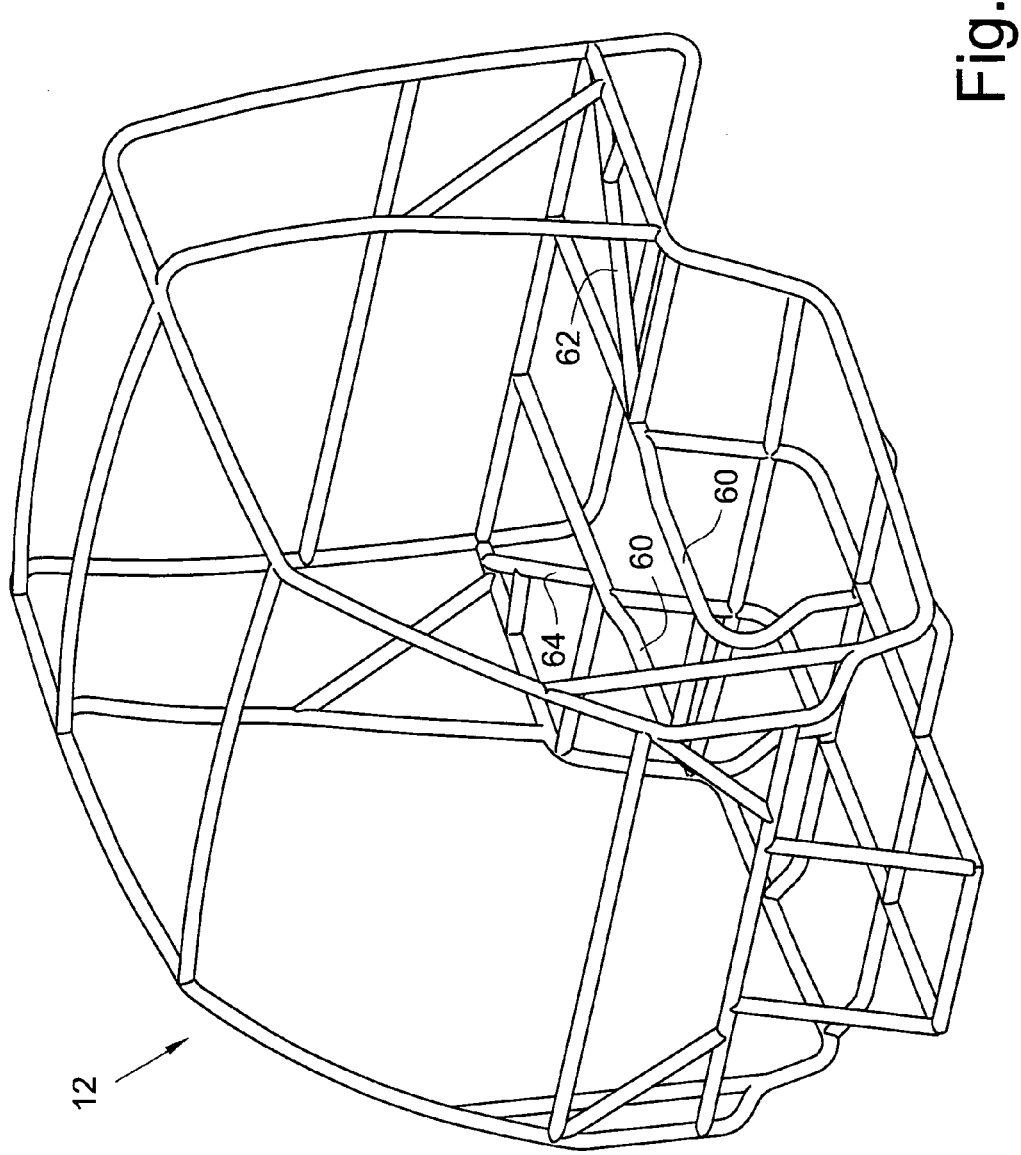
FIG. 1 is a perspective view of a preferred embodiment of the bearing frame of a four-wheeled vehicle according to the invention.
Figure 2:
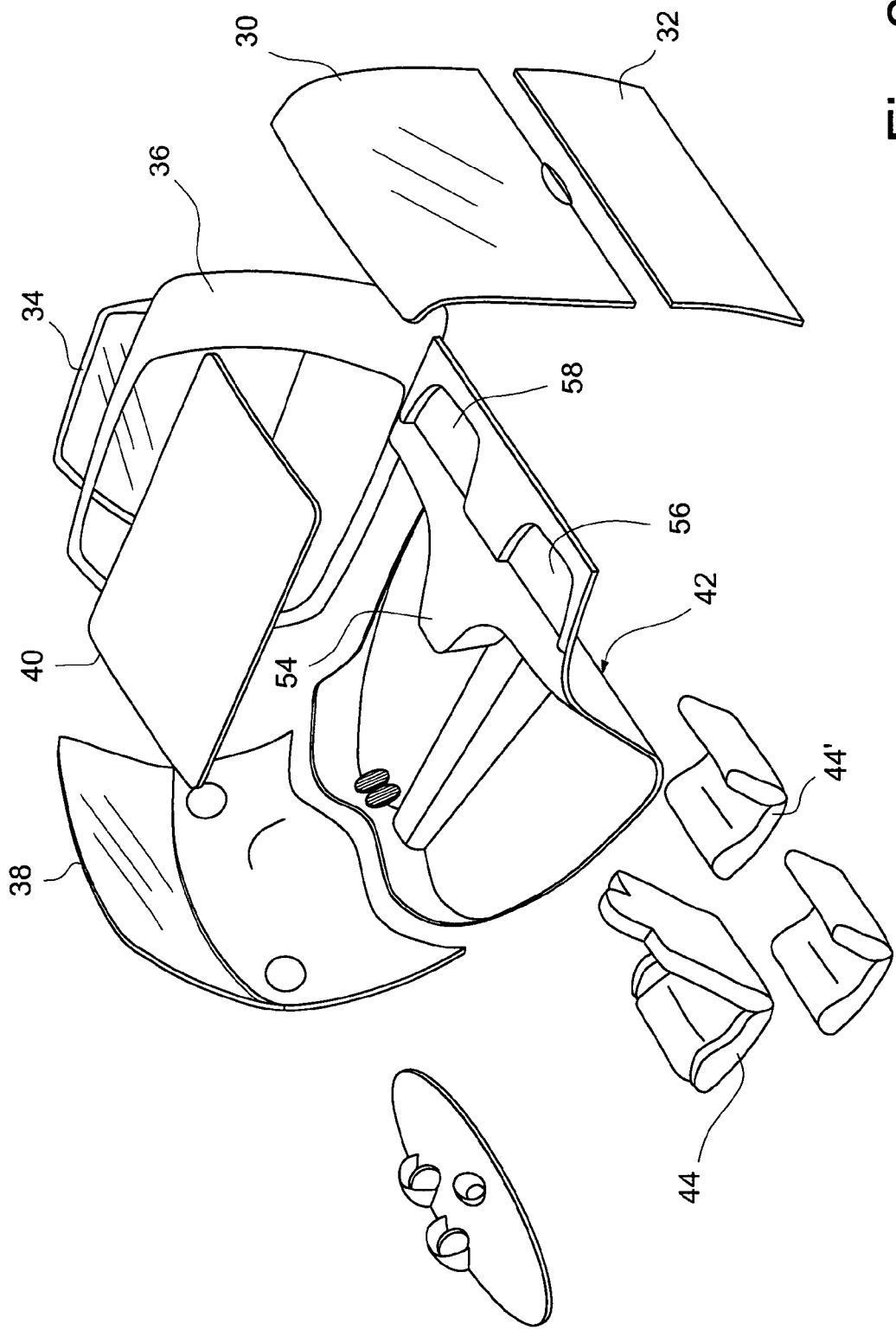
FIG. 2 is an exploded perspective view of the components of the body of a four-wheeled vehicle according to the invention.
Figure 3:
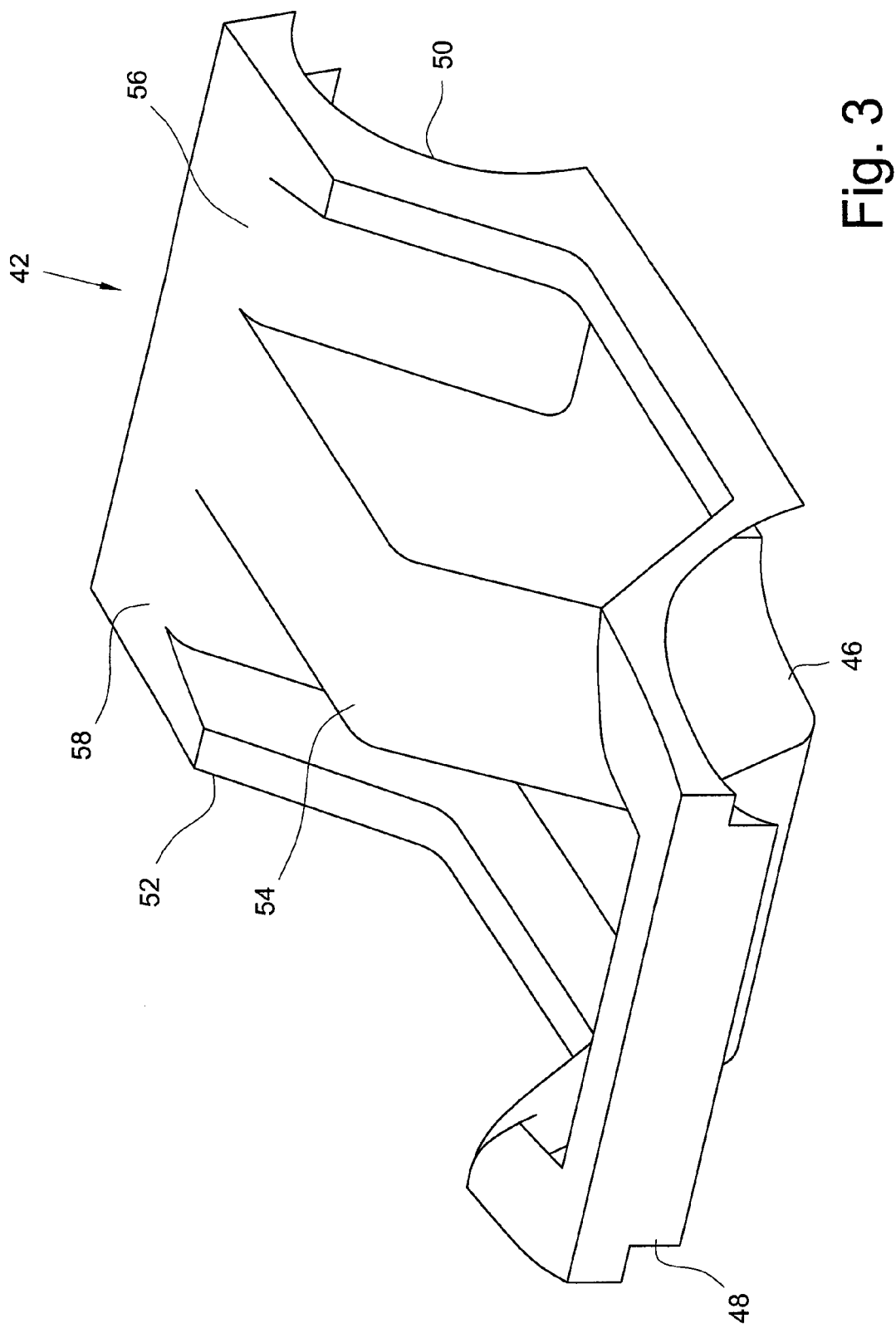
FIG. 3 is a perspective view of a component of the bearing frame of a four-wheeled vehicle according to the invention.

With reference to the figures, a four-wheeled vehicle according to the present invention, is shown generally indicated with reference number 10. The vehicle 10 comprises, in a per se known manner, a bearing frame 12, two front steered wheels 14 and 16 and two rear wheels 18 and 20 with fixed axis 144. The vehicle 10 further comprises an engine unit 22, which may be of the internal combustion engine, electric motor or hybrid engine, steering means 24 through which it is possible to operate on the front wheels 14 and 16, a front suspension unit 26, connecting the frame 12 to the front wheels 14 and 16, and a rear suspension unit 28, connecting the frame 12 to the rear wheels 18 and 20.

The frame 12 is configured to be suitably covered with a closed or open type body, as better specified hereinafter. The engine unit 22 is preferably accommodated in the rear part of the vehicle 10 and, hence, the drive of the vehicle 10 is on the rear wheels 18 and 20. The transmission unit, interposed between the engine unit 22 and the axle shafts of the rear wheels 18 and 20, is preferably of the automatic type.

The vehicle 10 is intended to have a ride height comprised between 1500 and 1650 mm, a width comprised between 1400 and 1550 mm and a length comprised between 2300 and 2600 mm. A total weight of the vehicle 10 lower than 400 Kg (excluding the traction batteries), is also provided for in a manner such that the vehicle 10 itself falls within the category of quadricycles.

Figure 10:
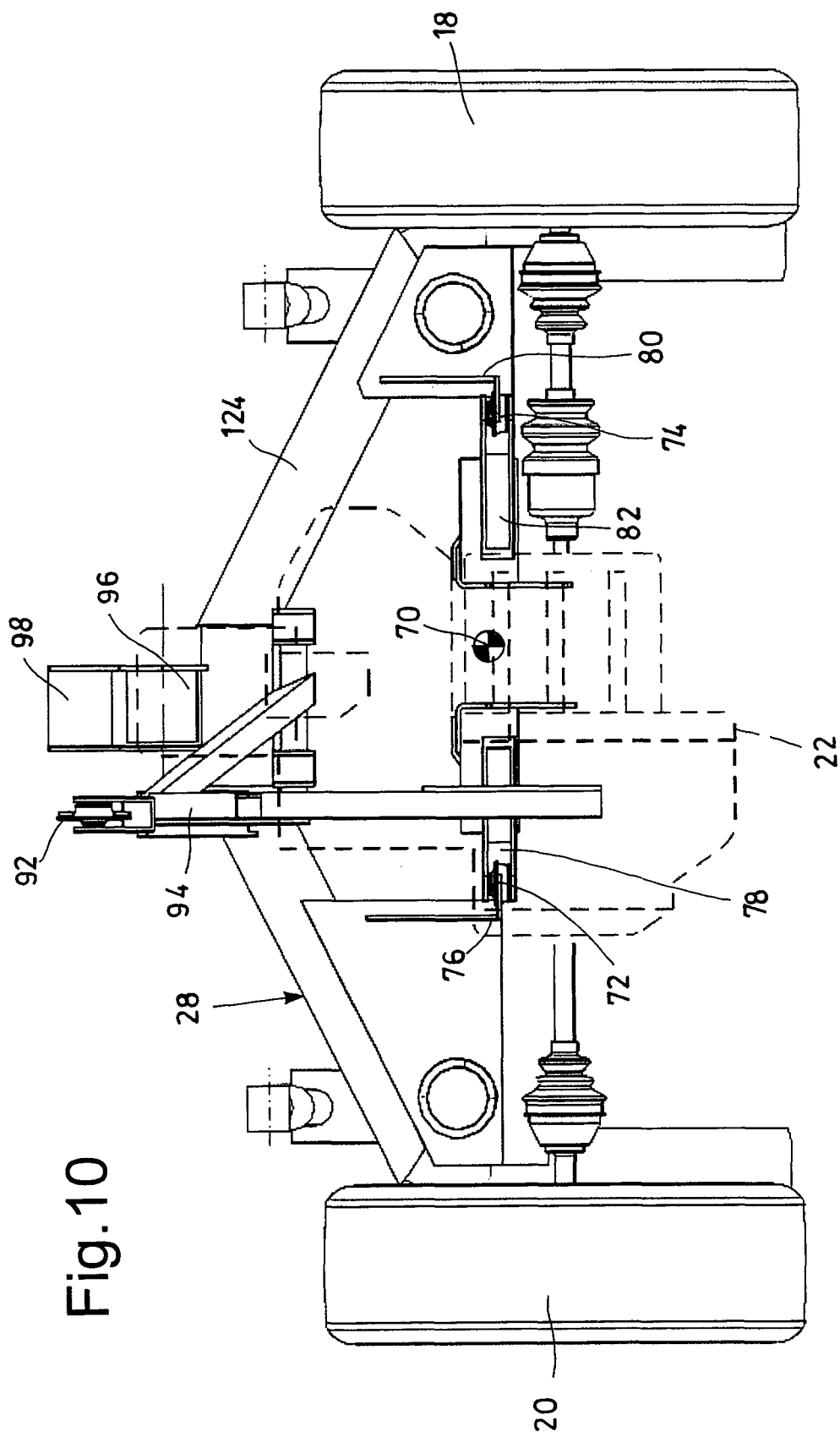
FIGS. 10, 11 and 12 are other detailed views, respectively top, side and rear, of the engine unit and of the rear suspension unit of a four-wheeled vehicle according to the invention.
Figure 16:
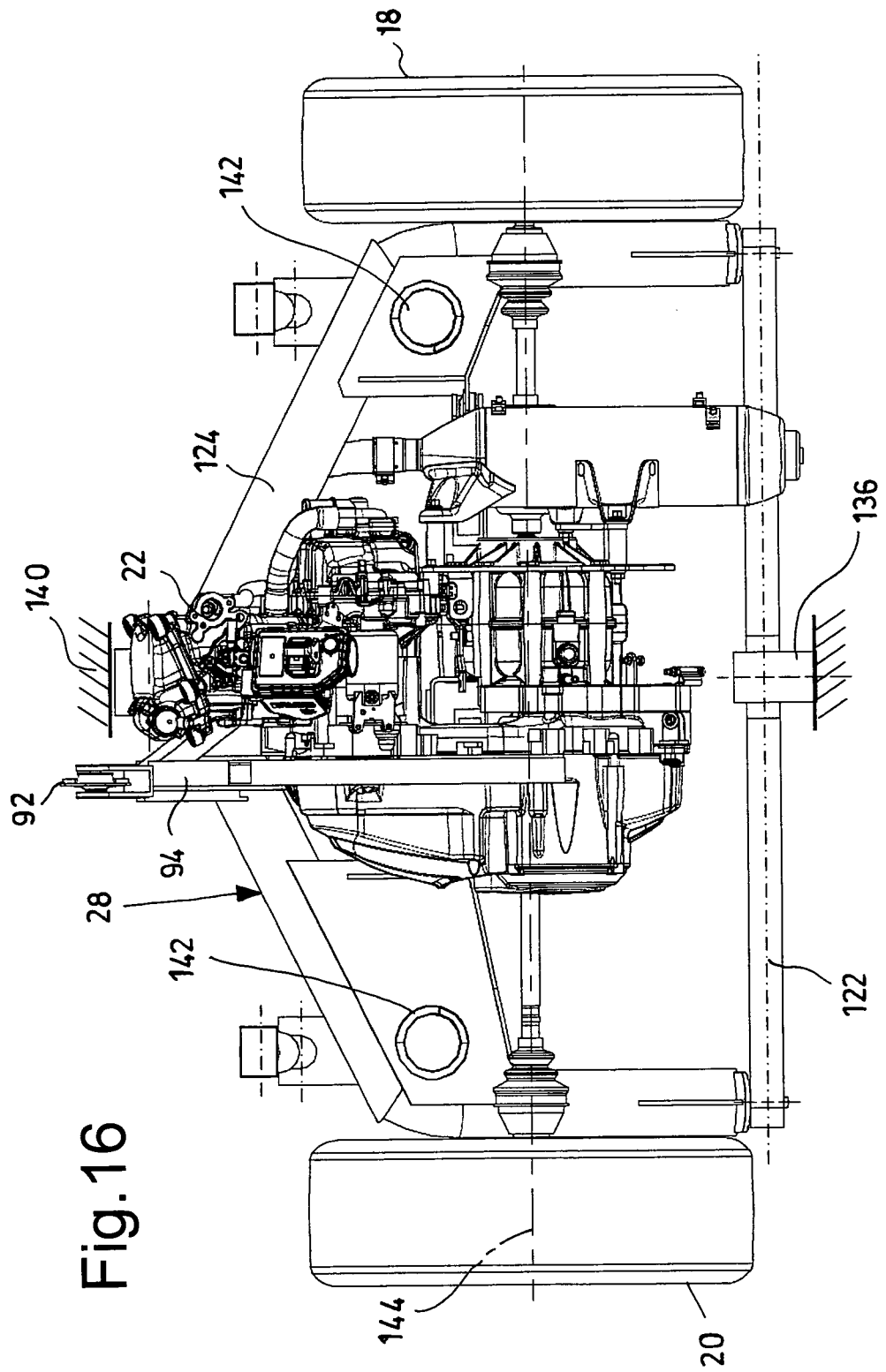

The rear suspension unit 28, as shown for example in FIGS. 10 and 16, is preferably of the rigid bridge type—omega-shaped or, more simply, U-shaped or even V-shaped. Such rear suspension unit 28 is particularly suitable to support the weight of the non-suspended masses of the vehicle 10 and of the engine unit 22. The front suspension unit 26 instead preferably has an independent wheels scheme of the "McPherson" type. Both the front suspension unit 26 and the rear suspension unit 28, may be provided with stabilizing bars (not shown), suitable to reduce the roll of the vehicle 10 especially in the more "sporting" versions. The steering means 24 are for example of the steering wheel type, with reduction ratio such not to cause an excessive manoeuvre effort.

Such solutions for the rear suspension unit 28, the front suspension unit 26 and the steering means 24, alongside the short wheelbase of the vehicle 10, allow the vehicle 10 itself to be extremely manoeuvrable, with a steering radius smaller than 4 m, and thus agile in city traffic and both easy to drive and park. However, it should not be excluded that the rear suspension unit 28, the front suspension unit 26 and the steering means 24 may be obtained otherwise, without departing from the scope of protection of the invention.

In the preferred embodiment of the vehicle 10, shown in the attached figures, the front track, intended as the distance between the respective centres of the two front wheels 14 and 16, is smaller with respect to the rear track, in turn intended as the distance between the respective centres of the two rear wheels 18 and 20. The tyres of the front wheels 14 and 16 and of the rear wheels 18 and 20 are of the radial type, preferably accommodated in 13" rims, and they are provided with a tread having the automobile types of grooves. The measurements of the track, front and rear, of the vehicle 10, as well as the measurements of the tyres, may also be clearly different from those outlined above, without departing from the scope of protection of the present invention.

The vehicle 10 is also provided with a braking system operating on the four wheels 14, 16, 18 and 20. More in particular, the braking system may comprise disk brakes and/or mechanical and/or hydraulic control drum brakes, suitably dimensioned so as to obtain optimal and extremely safe braking of the vehicle 10 under all conditions of use. The braking and accelerator controls are of the pedal 66 type, with shape suitable to comply with the approval requirements in force in the main countries.

The frame 12 is of the tubular type, with a "trestle-like" welded structure. The steel pipes that form the frame 12 may have a variable section, round or square-shaped, so as to obtain the best compromise between rigidity, weight, cost and easy final assembly.

The main interior finishing elements of the vehicle 10 are provided to have the function of "box-containing" the body, whose panels are anchored to the frame 12 in a suitable manner, compatibly with an acceptable technical and aesthetic solution.

In detail, a possible version of the body of the vehicle 10 provides for a rear openable door 30, made of a polycarbonate reinforced by a metal structure, and a rear panel 32 having the function of covering the engine unit 22. Both the doors 34 for access to the vehicle 10, two of them (one for each side of the vehicle 10) and the sides 36 are provided with large transparent surfaces, with the aim of limiting any feeling of oppression related to the small dimensions of the cabin.

The windshield glass 38 is conveniently made of laminated glass, so as to obtain optimal safety levels in the cabin. Still for safety purposes, the side glasses of the doors 34 are also made of glass material and they are provided with suitable opening means, automatic or manual. Alternatively, the side glasses of the doors 34 may also be fixed. The roof 40 of the vehicle 10, where provided, may also be of the fixed or opening type, either partially or completely.

The floor or deck of the vehicle 10 is made up of a tank-shaped structural element 42, made integral with the frame 12 and operating as elements for supporting the seats 44 and 44' of the vehicle 10. The tank 42 is preferably made of fibreglass or made using materials having similar characteristics and comprises, made in a single piece therewith, front wheelhouses 46 and 48 for the front wheels 14 and 16 and rear wheelhouses 50 and 52 for the rear wheels 18 and 20. A cavity suitable to contain the engine unit 22 and the respective transmission unit, as well as for forming a possible luggage compartment, underneath the tank 42, at the rear part with respect thereto, is also obtained.

The tank 42 is configured to ensure, besides the necessary functionality and ergonomics features for the people inside the vehicle 10, also suitable safety measures regarding any possible shock or external impact that the vehicle 10 may be subjected to. The presence of the tank 42 is thus important for obtaining some of the important objectives provided for in the step of designing the vehicle 10: in particular, the tank 42 is fundamental due to the fact that it is a structure that is light and easy to implement on the vehicle 10, but it is also simultaneously extremely efficient structurally, thus allowing the vehicle 10 itself to attain definitely higher resistance and robustness characteristics with respect to those of most quadricycles currently available in the market.

Figure 4:
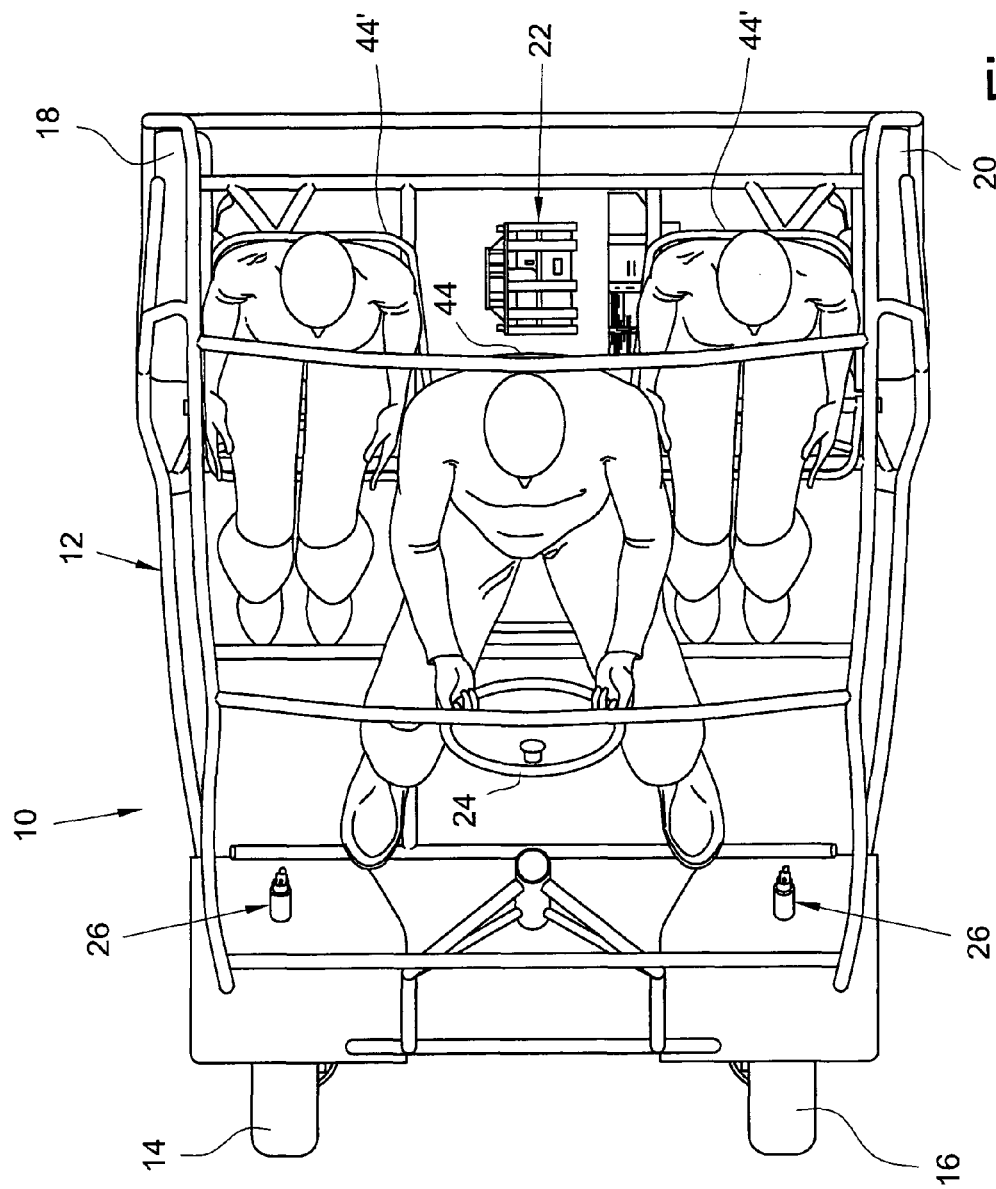
FIG. 4 is a top plan view of a four-wheeled vehicle according to the invention, without the body and in the configuration of transporting two passengers not including the driver.
Figure 5:
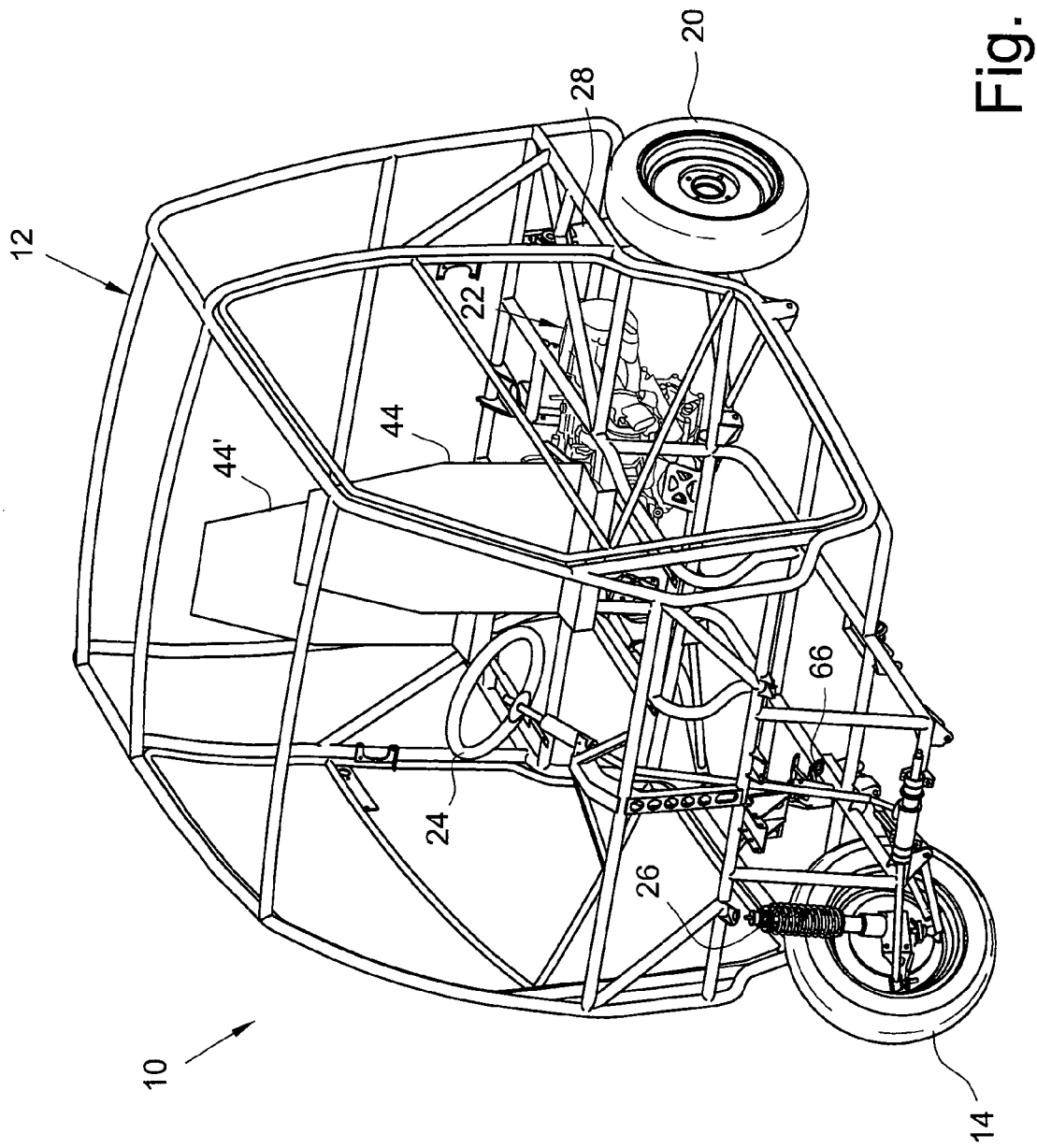
FIGS. 5 and 6 are perspective views, respectively front side and rear side, of the vehicle of FIG. 4.
Figure 6:
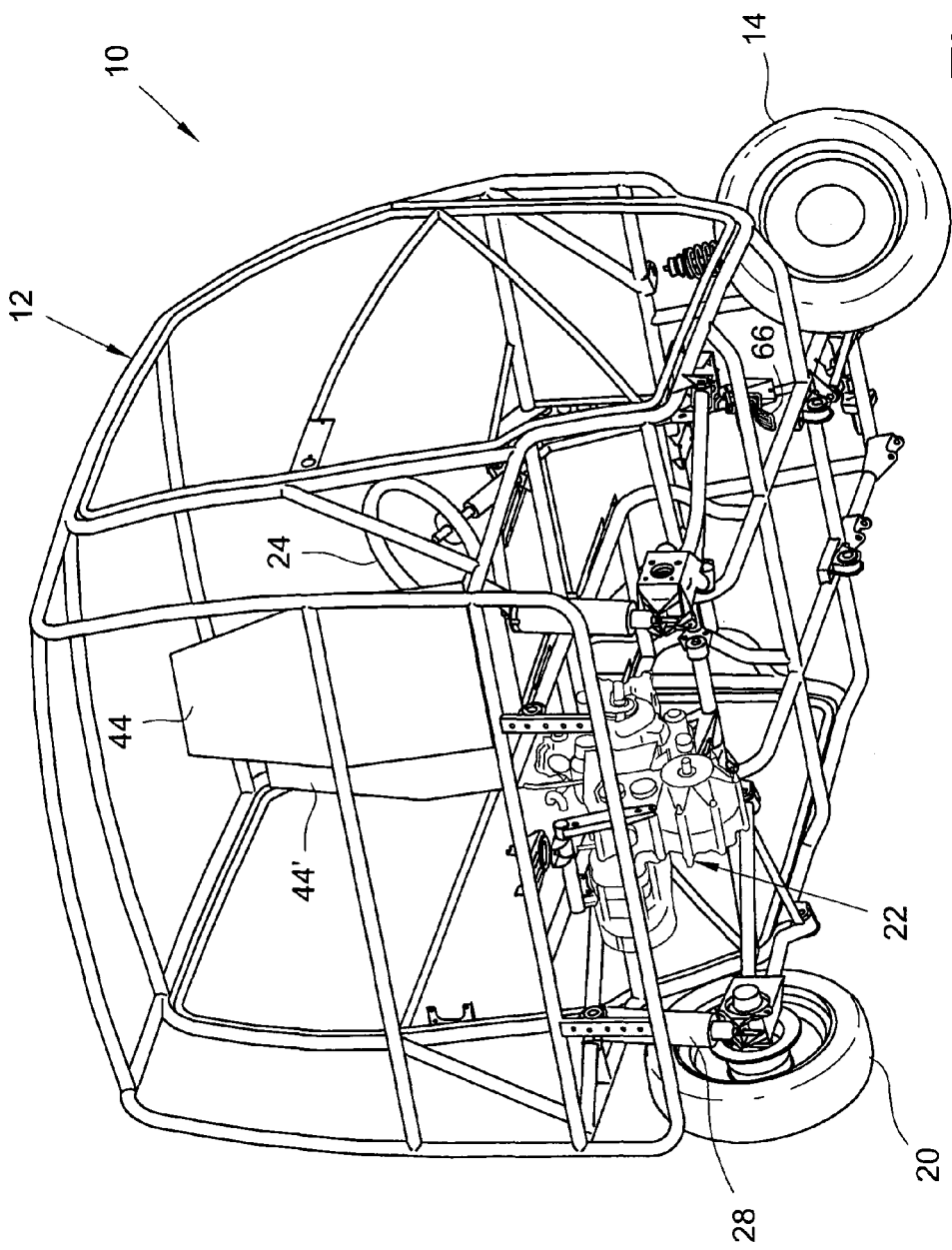
Figure 7:
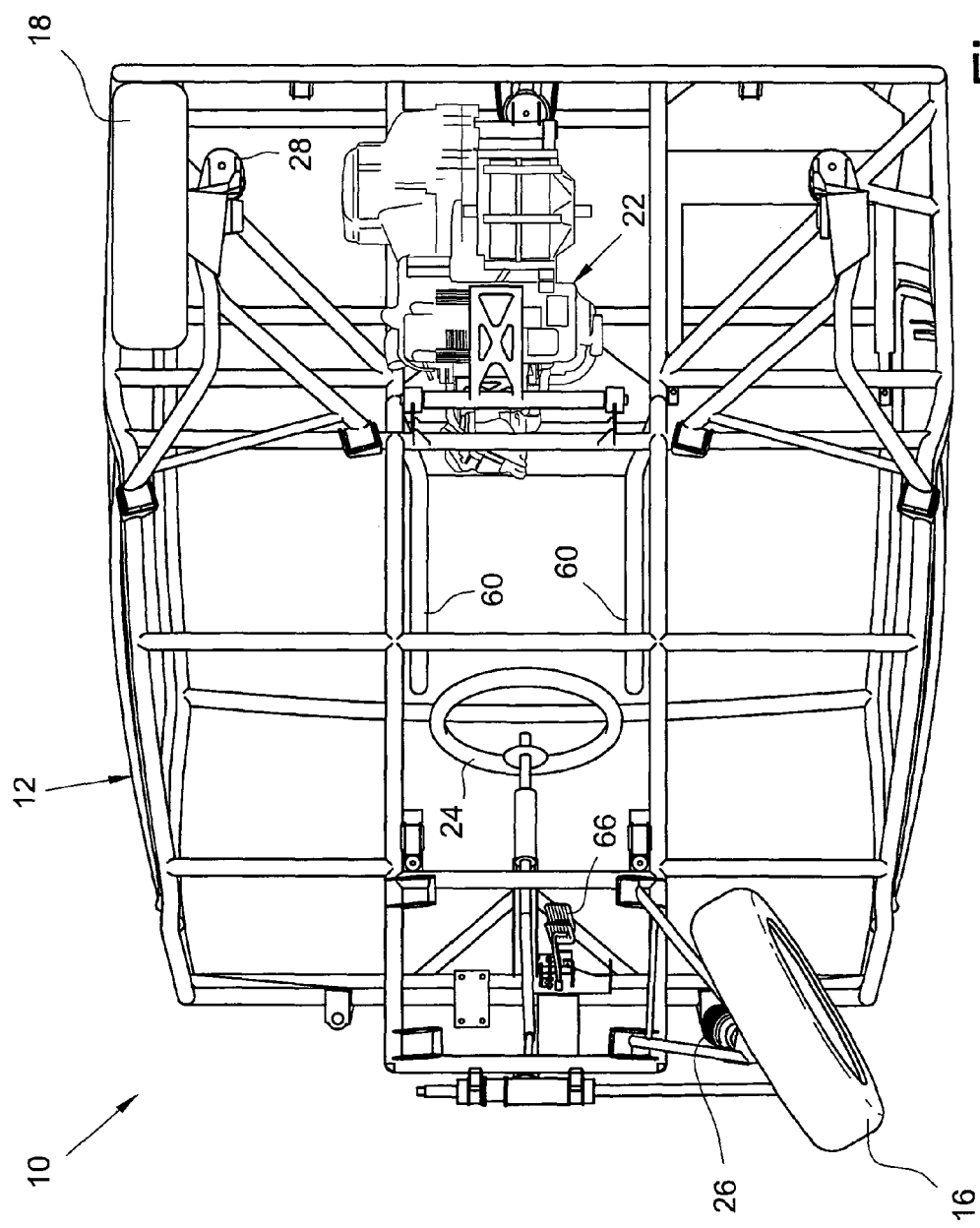
FIG. 7 is another top plan view of the vehicle of FIG. 4.
Figure 8:
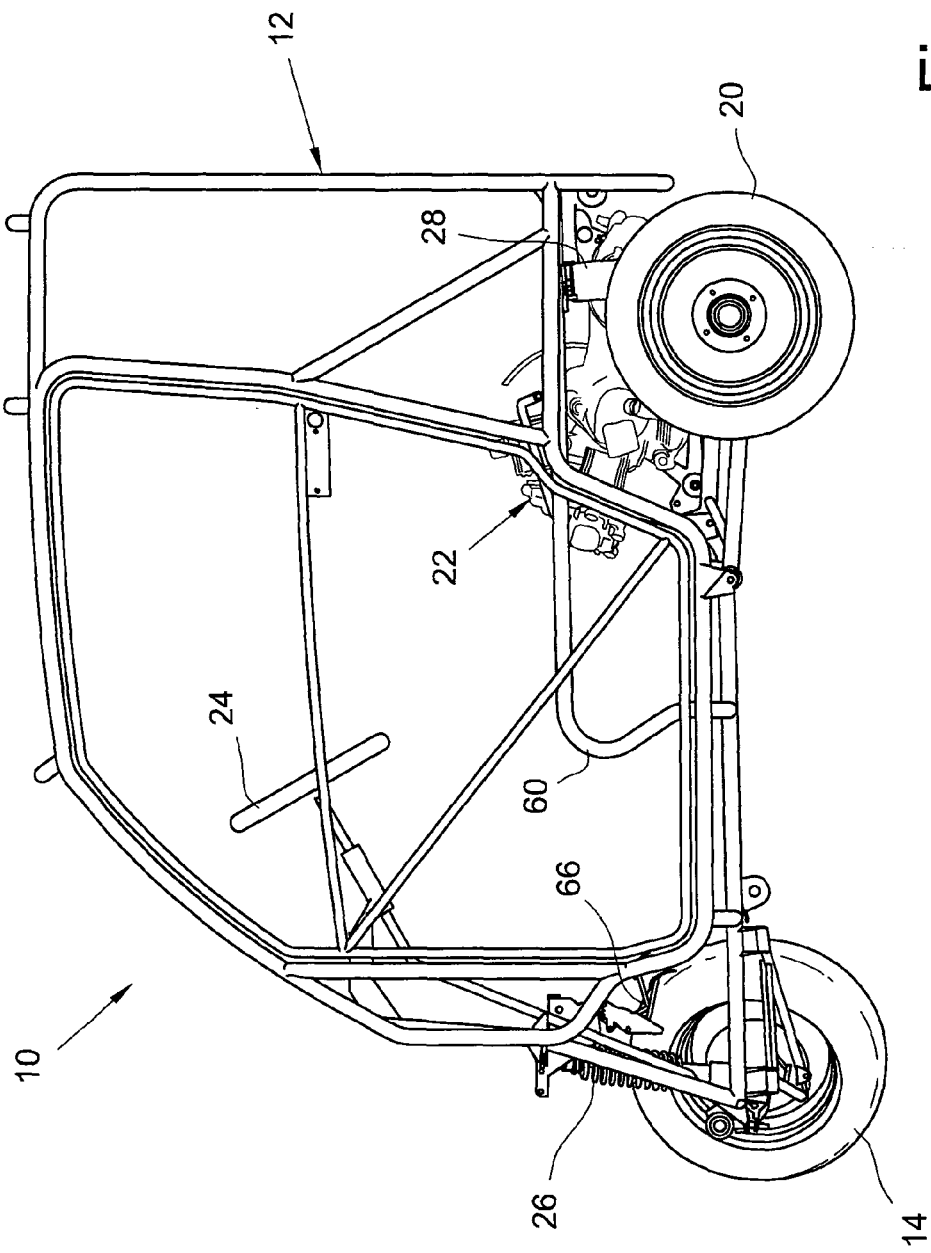
FIG. 8 is a side elevational view of the vehicle of FIG. 4.
Figure 9:
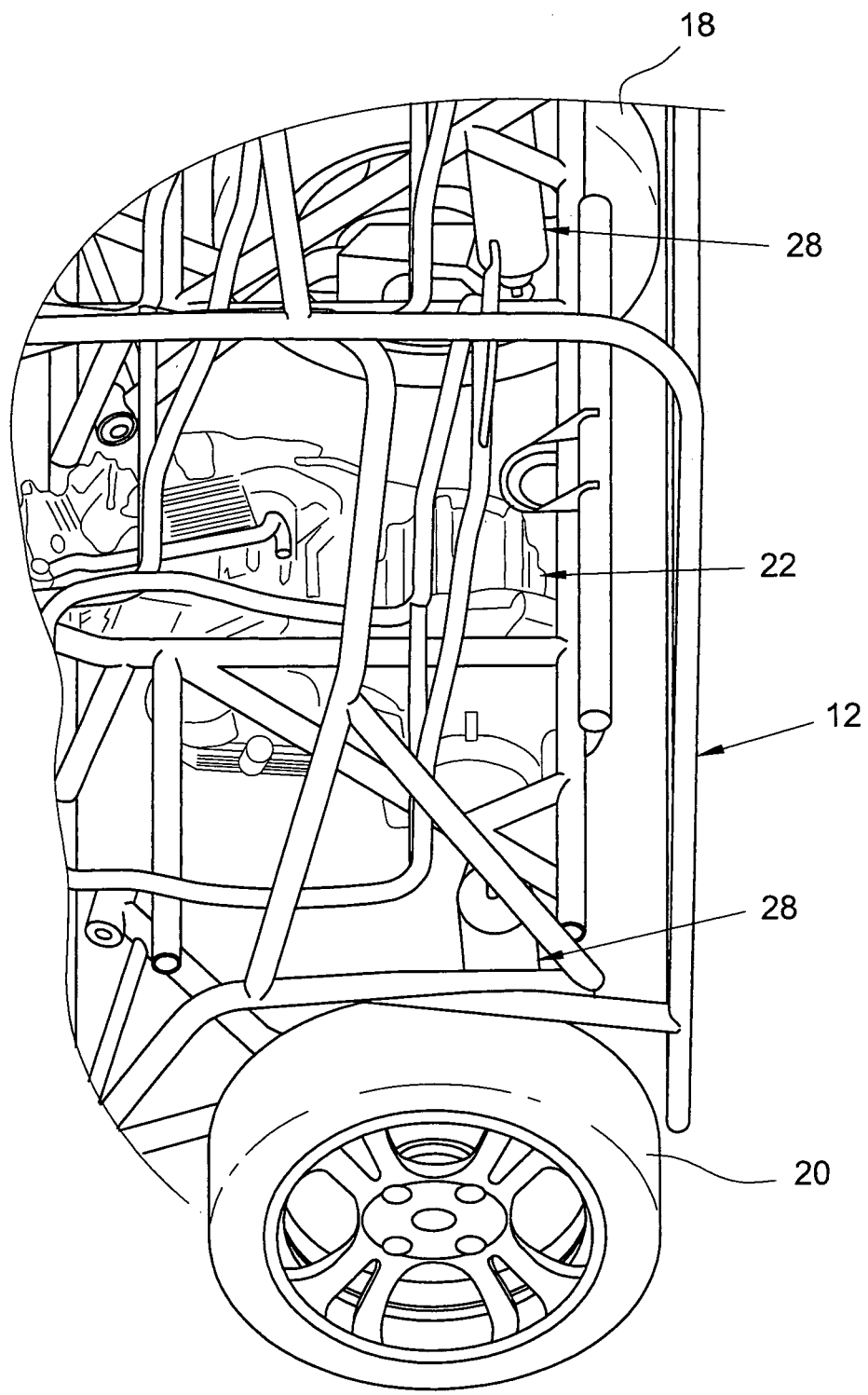
FIG. 9 is a detailed view of the engine unit and of the rear suspension unit of a four-wheeled vehicle according to the invention.

Given that an object of the present invention is that of providing a vehicle 10 extremely small in terms of dimensions and weight, however capable of comfortably and functionally accommodating three people (two passengers plus the driver), the driver is positioned at a central position and the two passengers adjacent to each other, positioned laterally and receded according to a predefined distance with respect to the driver himself. The three people are positioned with the legs directed towards the front part of the vehicle, as illustrated in the top view of FIG. 4.

In order to attain the abovementioned objective, the tank 42 is centrally provided with a raised platform 54, which forms the base for supporting the driver's seat 44. Two further raised platforms 56 and 58, which form the base for supporting the two seats 44' intended to accommodate the passengers of the vehicle 10, are thus respectively obtained on the rear edges of the tank 42, above the rear wheelhouses 50 and 52. The abovementioned cavities for the engine unit 22, the transmission unit and the possible luggage compartment may thus be obtained beneath such raised platforms 54, 56 and 58.

In order to guarantee proper application of the tank 42 onto the frame 12, as well as guarantee the structural efficiency of the tank 42, the frame 12 is suitably shaped to obtain a perfect shape coupling with such tank 12. In detail, the frame 12 is provided with one or more specific tubular elements 60 which are inserted in shape coupling into and underneath the cavity provided for in the raised platform 54 of the tank 12, thus guaranteeing the required structural rigidity. Similarly, suitable tubular portions 62 and 64 of the frame 12 in shape coupling with the two raised platforms 56 and 58 and which in turn form the support base thereof, are also provided for underneath the two raised platforms 56 and 58, which form the base for supporting the passengers seats 44'.

The solution which provides for the driver seated at a central position in the vehicle 10 is fundamental to attain the intended objectives. As a matter of fact, such arrangement allows gaining room longitudinally, given that the lower limbs of the driver end up positioned centrally with respect to the front wheels 14 and 16, the front suspension unit 26 and the front wheelhouses 46 and 48, thus allowing a recession of such elements without having a negative impact on the comfort of the driver himself. This allows eliminating the problem related to the overall dimensions of the front wheelhouses 46 and 48 on the feet of the driver.

The room for positioning the pedals 66 and the steering wheel 24 is also obtained without the occurrence of negative interferences on the functionalities of the same and/or of the front suspension unit 26 and of the front wheels 14 and 16. An ideal comfort for the driver also regarding the manoeuvrability of the upper limbs and the bust in general is also guaranteed in such a manner that the driver may easily interact with all the instruments provided on board the vehicle 10.

Lastly, the passengers are also positioned in a very advantageous manner, given that there is both enough room for the their lower limbs, which may be stretched at the sides of the driver's seat 44, and enough room for the upper limbs, separated by a suitable panel arranged above the engine compartment, which may be possibly used as an armrest. The effect of "partial overlapping" longitudinally between the driver and the passengers also has the advantage of the former not feeling like a mere "taxi driver", but helps involving him in the activities of the entire cabin, thus contributing to make the vehicle 10 extremely "friendly" and suitable to a youthful and lively public.

Though up to now reference has been made to two seats 44' intended to accommodate the passengers of the vehicle 10, a third seat intended to accommodate a third passenger, excluding the driver could also be provided. Such third passenger seat (not shown) could be obtained between the two rear seats 44', or in any other possibly available space in the vehicle 10, and it shall be clearly provided with all the safety requirements provided for by the laws in force, without modifying the arrangement of the driver's seat 44 and the other two passenger seats 44' described previously.

Both the driver and the passengers shall be provided with respective seats 44 and 44' shaped anatomically, so as to suitably exploit the interior spaces, accommodate the passengers in an extremely comfortable manner and guarantee the required retention and safety characteristics. Obviously, the vehicle 10 shall be provided with safety belts for the three (or four) seats 44 and 44'. The rear passenger seats 44' shall be provided with a suitable system for longitudinal positioning/tilting, so as to increase the load capacity of the vehicle 10.

The solution of at least three "misaligned" seats is thus ideal to attain the functionality objectives (access to all the main instruments of the vehicle 10, visibility), interior livableness (ideal comfort both for the driver and for the two passengers) and overall dimensions (small dimensions, both longitudinally and laterally, of the vehicle 10) provided for by the invention.

Regarding the engine unit 22 of the vehicle 10, it is preferably of the hybrid type (with an internal combustion engine and an electric motor operatively connected to each other), of the motorcycle derivative, with suitable cubic capacity and an automatic continuously variable transmission unit (CVT) provided with a differential-reduction gear-inverter unit. Such engine unit 22 allows obtaining an extremely ecologically advantageous vehicle 10 but at extremely low costs. Further advantages regard the possibility of gaining access to urban centres even in cases where traffic is limited or in historical centres where vehicles provided with common internal combustion engines are not allowed, as well as that of having extremely low management costs (maximum efficiency).

Furthermore, due to the presence of the automatic continuously variable transmission unit, the urban driving may be less stressing and this is fundamental due to the fact that the vehicle 10 is purposely designed to easily and safely move within urban traffic. The maximum speed provided for the vehicle 10 is of about 80 Km/h, ideal for the circulation of such vehicle 10 in the chaotic urban traffic.

The positioning of the engine unit 22 in the vehicle 10 is studied to attain the objects of comfort/functionality provided for. As mentioned previously, the engine unit 22 is actually positioned longitudinally with respect to the vehicle 10, in the cavity provided for between the two raised platforms 56 and 58 which form the base for supporting the passengers seats 44'.

Such positioning is optimal due to the fact that it ideally exploits one of the vacant spaces left on the vehicle 10, i.e. the space comprised between the raised platforms 54, 56 and 58 of the tank 42 and the frame 12 that supports it. It is therefore possible to further reduce the dimensions of the vehicle 10 both longitudinally and laterally, not interfering with the passengers but contributing to create the room for a possible armrest.

In the cavity obtained underneath the raised platform 54, which forms the base for supporting the driver's seat 44, there may be positioned batteries and systems for controlling the engine hybrid unit 22. For such purpose, the raised platform 54 may be provided with one or more inspection ports (not shown) for carrying out the maintenance, ordinary and extraordinary, of the engine unit 22 of the vehicle 10.

According to the invention the rear suspension unit 28, alongside providing suitable robustness and rigidity with the aim of proper operation of the vehicle 10, it is also capable of supporting the overall weight of the engine unit 22 which, thus, substantially weighs on the two rear wheels 18 and 20 instead of on the system for constraining to the frame 12. The engine unit 22 is actually elastically constrained with respect to the rear suspension unit 28 by means of a suspension and "filtering" mechanism of the barycentric type, made up of two elastic support pins and a reaction rod.

The fact of transferring most of the stresses and weight of the engine unit 22 directly onto the rear wheels 18 and 20 allows reducing the amount of stresses transmitted to the frame 12. The introduction of a double "filtering" system between the engine unit 22 and the frame 12 of the vehicle thus allows optimizing the response of such suspension mechanism over the entire frequency range of use. Such technical solution is particularly efficient on rear-drive vehicles, wherein the rear suspension is particularly suitable to support the suspended masses of the vehicle and the engine unit. The negative effects on the driving comfort and on the road holding, due to the increase of the non-suspended masses, are entirely negligible, especially when the dimensions and the weight of the engine unit are particularly small.

Figure 11:
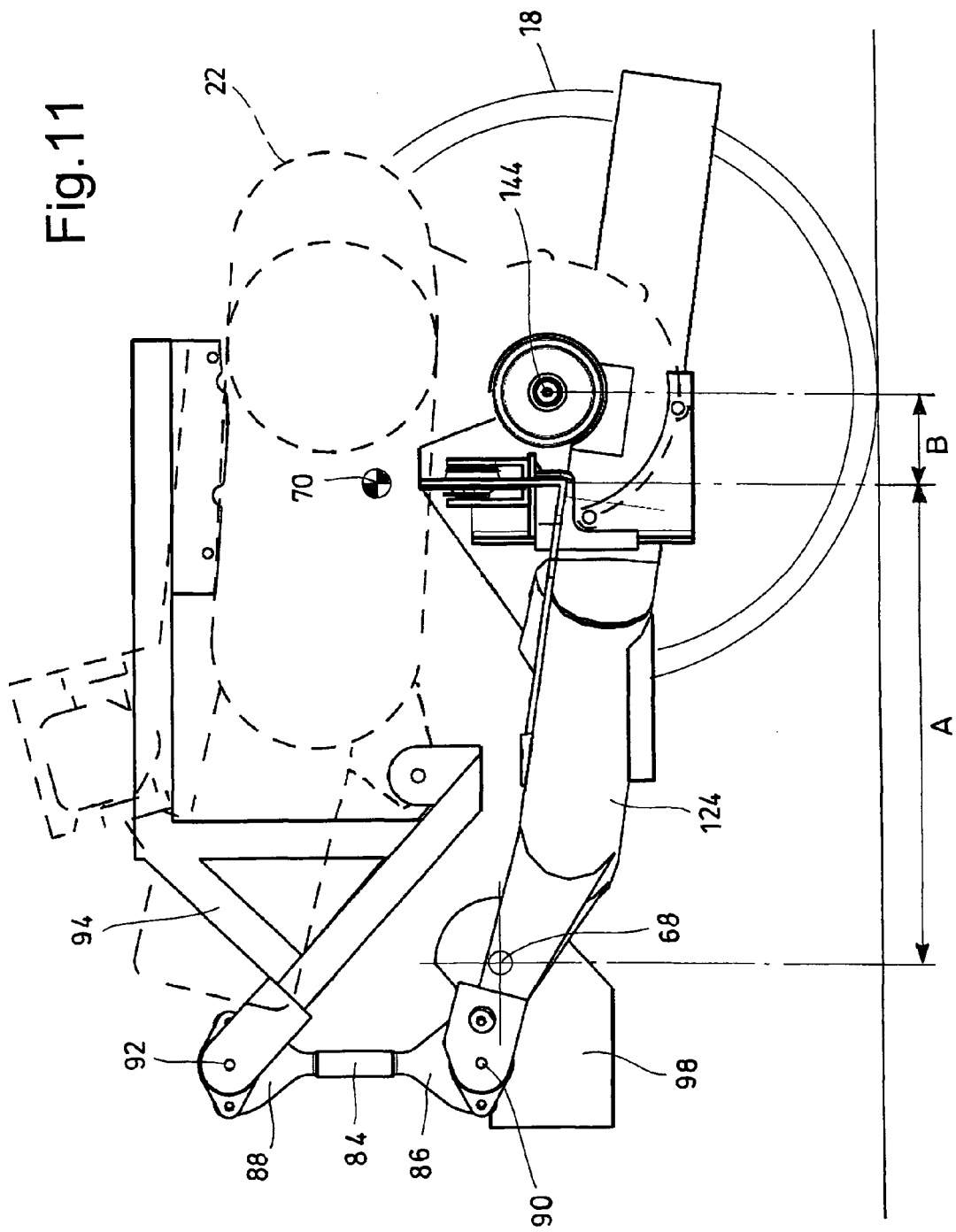

In detail, with reference to FIG. 11, the distance A between the point of constraint 68 of the rear suspension unit 28 to the frame 12 and the centre of mass 70 of the engine unit 22, measured in the direction of the centreline axis Z-Z of the vehicle 10, must be greater than the distance B between such centre of mass 70 of the engine unit 22 and the axle 144 of the rear wheels 18 and 20, also measured in the direction of the centreline axis Z-Z of the vehicle 10.

With reference now to FIG. 10, it should be observed how the engine unit 22 is provided with two fixing points with respect to the rear suspension unit 28. More precisely, such two fixing points are made up of a pair of lateral elastic support pins 72 and 74, directed according to the same axis which substantially passes through the centre of mass 70 of the engine unit 22 and arranged so as to support each about half the weight of the engine unit 22 itself. The elastic support pins 72 and 74 are constrained to the engine unit 22 respectively by means of a first pair of brackets 76 and 78, arranged at the left side with respect to the centreline axis Z-Z of the vehicle 10, and a second pair of brackets 80 and 82, arranged on the right side with respect to the centreline axis Z-Z of the vehicle 10 with reference to the direction of motion of the vehicle 10. The brackets 76 and 80, arranged towards the outer sides of the vehicle 10, are integral with the rear suspension unit 28, while the brackets 78 and 82, arranged internally towards the centreline axis Z-Z of the vehicle 10, are integral with the engine unit 22.

FIG. 11 shows the reaction rod 84, which represents a third constraint of the engine unit 22 with respect to the rear suspension unit 28, capable of supporting the share part of weight of the engine unit 22 not supported by the elastic support pins 72 and 74 and reacting to the drive torque of the engine unit 22 itself. The lower end 86 of the reaction rod 84 is constrained, by means of a first elastic bushing 90, to the rear suspension unit 28, while the upper end 88 of such reaction rod 84 is constrained, by means of a second elastic bushing 92, to the engine unit 22 through an adapter bracket 94.

The elasticity of the side support pins 72 and 74, the position of the reaction rod 84 and the elasticity of the end bushings 90 and 92 thereof are such to provide maximum filtering of the stresses generated by the operation of the engine unit 22 and provide—in their entirety—the suspension mechanism and, thus, the first filtering level. A second filtering level may be provided by means of an auxiliary suspension mechanism between the rear suspension unit 28 and the frame 12 of the vehicle 10. Such auxiliary suspension mechanism operates both by means of a third front elastic bushing 96, which provides the elastic constraint between the rear suspension unit 28 and the frame 12 through a bracket 98, and through the vertical elasticity of the tyres of the rear wheels 18 and 20.

Figure 12:
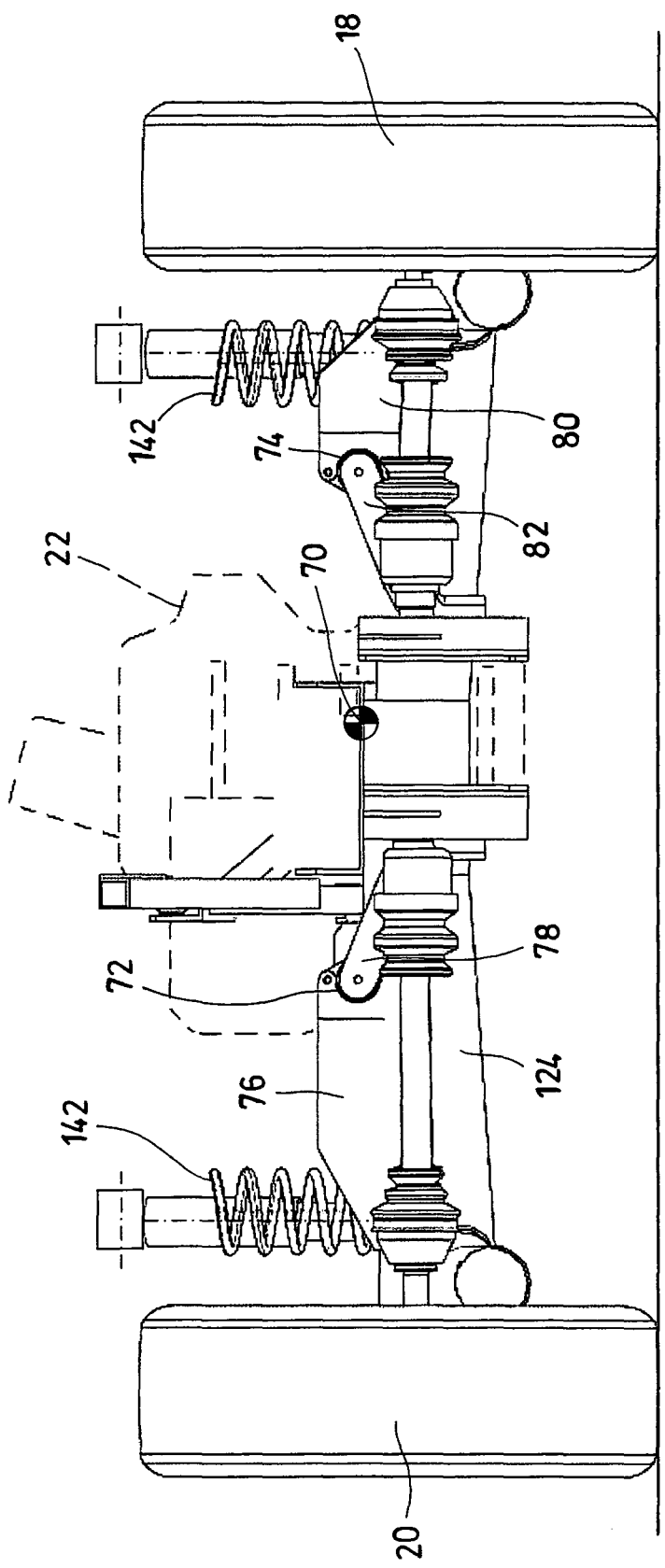

FIG. 12 represents a rear view of the engine unit 22 installed on the rear suspension unit 28 of the vehicle 10. This figure shows how the support pins 72 and 74 for supporting the engine unit 22 are arranged in a substantially symmetric manner with respect to the centre of mass 70 of the engine unit 22. The elastic connection of the engine unit 22 on the rear suspension unit 28 of the vehicle 10 also considerably simplifies the "bodywork" of the engine unit 22 itself, which may be assembled in a special external station with respect to the vehicle 10 assembly line and applied on such vehicle 10 simultaneously with the rear suspension unit 28, thus reducing the overall assembly times.

Figure 13:
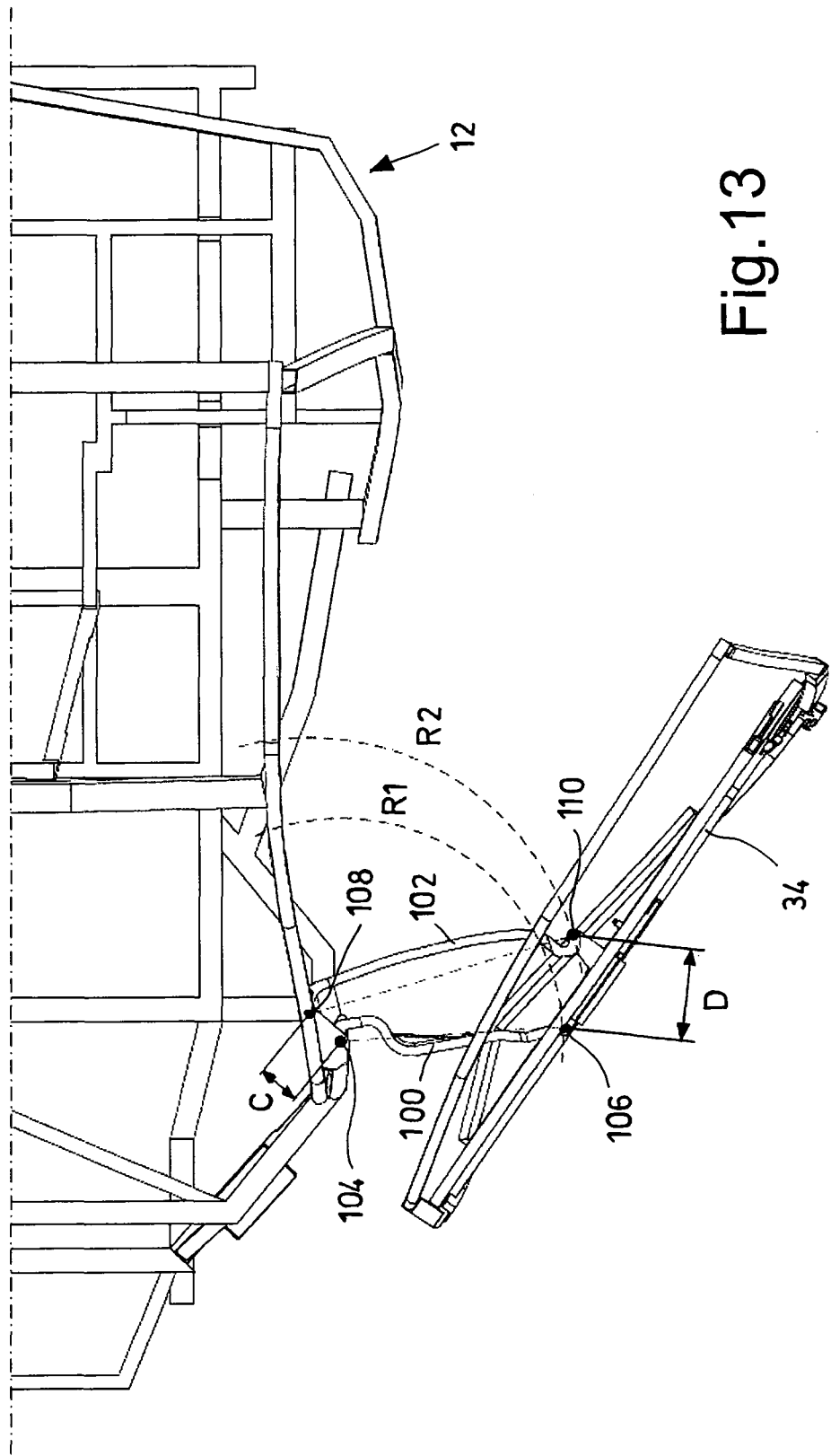
FIGS. 13, 14 and 15 are detailed views, respectively top, side and top again, of the system for opening the doors of a four-wheeled vehicle according to the invention.
Figure 15:
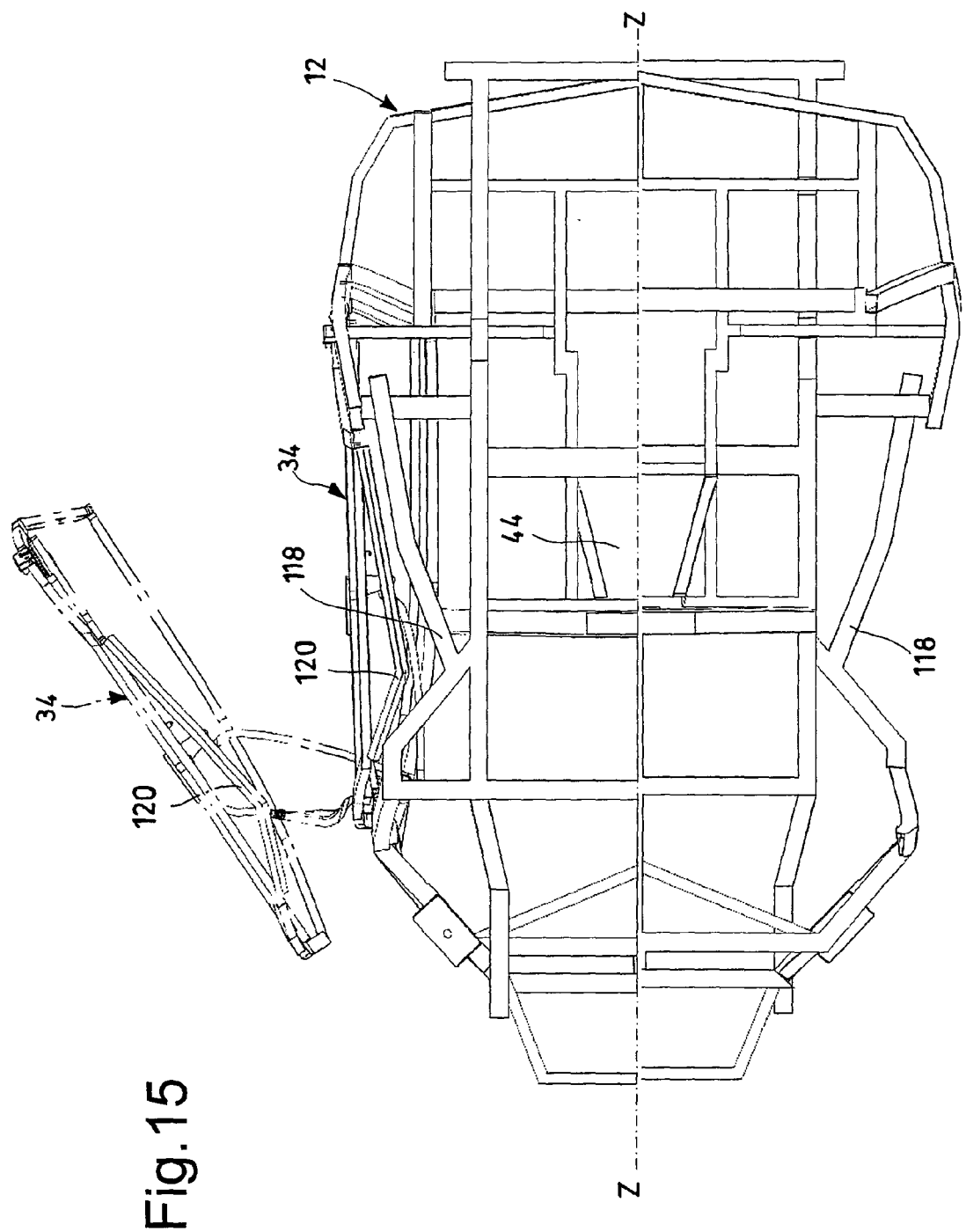

FIG. 13 represents a top view of a longitudinal portion of the frame 12 and shows the mechanism for connection, with respect to the frame 12, and opening/closing of one of the doors 34 for access to the vehicle 10. FIG. 13 illustrates the door 34 alone arranged on the left side of the vehicle 10, but it is clear that the same mechanism for connection to the frame 12 and for opening/closing may also be applied to the opposite door 34 (as shown in FIG. 15).

The mechanism for connection to the frame 12 and for opening/closing each door 34 is of the so-called "pantograph" type and it essentially comprises two arms 100 and 102 provided with joints at the ends thereof. In detail, the mechanism for connection to the frame 12 and for opening/closing each door 34 comprises a support arm 100, provided with a first end joint 104 with respect to the frame 12 and a second end joint 106 with respect to the door 34, and a guide arm 102, also provided with a first end joint 108 with respect to the frame 12 and a second end joint 110 with respect to the door 34. The cross section of the guide arm 102 has a smaller area with respect to the area of the cross section of the support arm 100, in that such support arm 100 is suitable to support the weight of the door 34, while the guide arm 102 solely serves the function of univocally defining the trajectory of the door 34 itself according to well known kinematic laws.

The shape, dimensions and inclination of the axes of the end joints 104, 106 and 108, 110 respectively of the support 100 and guide 102 arms may obviously vary depending on the design conditions of the vehicle 10. Modifying the lengths R1 and R2 respectively of the support arm 100 and of the guide arm 102, as well as the distances C and D respectively between the respective joints 104 and 108 on the side of the vehicle and between the respective joints 106 and 110 on the side of the door, it is possible to confer to the door 34 the required movement, so as to optimize access to the vehicle 10 and the overall side dimensions with the door open according to well known kinematic laws.

Figure 14:
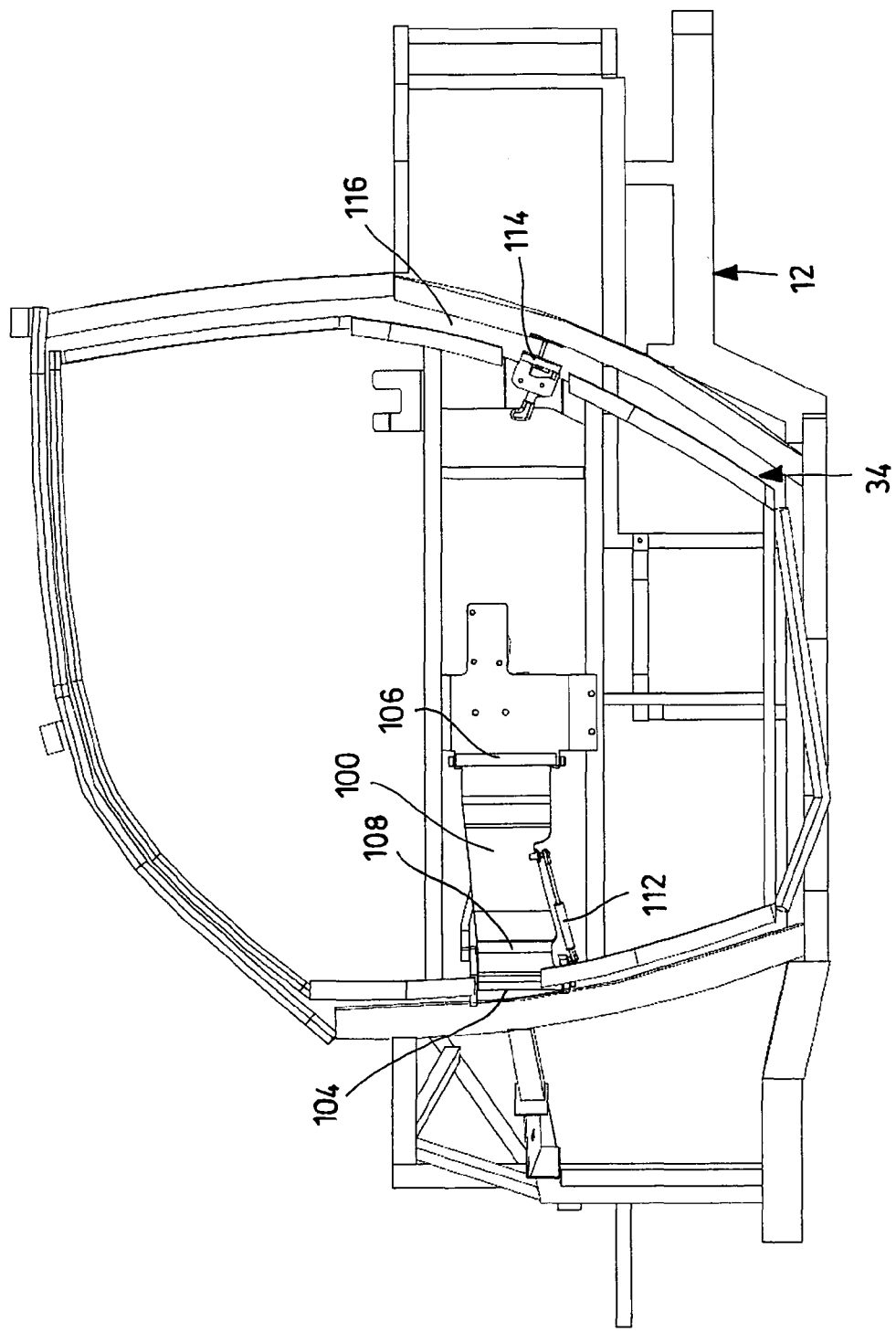

FIG. 14 shows a side view of the frame 12, in which a suitable stroke stop device 112, provided by means of a piston mechanism whose sliding is related to the position of the door 34 is visible. The stroke stop device 112 is capable of limiting the travel of the door 34 towards the front part of the vehicle 10. A special lock 114, arranged on the central upright 116 of the frame 12, provides the locking of the door 34 upon closing. The number and position of the locks 114 may obviously vary depending on the technical requirements.

FIG. 15 shows a top view of the frame 12, represented with one side equipped with the door 34 open (dashed line) and closed (full line) and with the other side completely without the door. As observable from FIG. 15, in order to facilitate the access of the driver, the frame 12 is provided—at the intersection between each door compartment and the floor of the vehicle 10—with specific tubular elements 118 folded inwards towards the centreline axis Z-Z of the vehicle 10. Such folded tubular elements 118 form a "discharge" which reduces the transverse distance between the central driver's seat 44 and the door compartment. The remaining portion of the floor of the vehicle 10, due to the presence of the folded tubular elements 118, is obtained in the lower part 120 of each door 34, so as to restore the continuity of the entire floor of the vehicle 10 when the doors 34 are closed.

The presence of the "pantograph-like" mechanism, with respect to the conventional so-called "compass-like" mechanism, allows reducing the overall side dimension of the vehicle 10 with the doors 34 open, as well as improving access to the vehicle, due to the simultaneous rotational and displacement movement of each door 34 towards the front part of the vehicle 10. Considering the same dimensions of the door 34, the "pantograph-like" mechanism allows reducing the overall side dimension, i.e. with the door 34 entirely open, by about 25% with respect to the conventional solutions, thus considerably saving space and enhancing parking possibilities.

FIG. 16 shows a top view of the rear suspension unit 28, provided with a leaf-spring-shaped flexible element 122 arranged transversely with respect to the centreline axis Z-Z of the vehicle 10 and arranged at the rear end of the bridge 124 of the rear suspension unit 28. The leaf-spring-shaped flexible element 122 is capable of vertically guiding and transversely constraining the bridge 124 in the respective rebound and roll motions with respect to the frame 12 of the vehicle 10.

As shown in FIGS. 20 and 21, the leaf-spring-shaped flexible element 122 is provided, at the opposite ends thereof, with two cylindrical cavities 126 suitable to accommodate respective elastic bushings 128 for connection between such leaf-spring-shaped flexible element 122 and the bridge 124 by means of pins 130 (FIG. 19). A third elastic bushing 132, accommodated in a third cavity 134 obtained, for the practical embodiment, at the centre of the leaf-spring-shaped flexible element 122, constrains the centreline of such leaf-spring-shaped flexible element 122 to the frame 12 of the vehicle 10, actually preventing the relative movement thereof in transverse direction. The pin of the third elastic bushing 132 is constrained to the frame 12 of the vehicle 10 by means of a bracket 136 (FIGS. 16, 17 and 18).

The two first elastic bushings 128 have a differentiated elasticity. In particular, the elasticity of the two first elastic bushings 128 measured in the transverse direction Q, with reference to the centreline axis Z-Z of the vehicle 10, is lesser than the elasticity in vertical direction P. This allows the side movements of the end of the leaf-spring-shaped flexible element 122 following the deformations induced by the relative motions of the rear suspension unit 28 with respect to the frame 12 of the vehicle 10. Furthermore, the elasticity measured in the transverse direction Q of the assembly of the elastic bushings 128 and 132 is equivalent to about half of the lateral elasticity of the front elastic bushing 138 of the bridge 124. This with the aim of reducing the self-steering effects of the rear suspension unit 28, induced by the lateral stresses generated when the vehicle 10 defines a curvilinear trajectory. Also the third elastic bushing 132 may have a differentiated elasticity, with elasticity in the transverse direction Q, with reference to the centreline axis Z-Z of the vehicle 10, different with respect to the elasticity in vertical direction P. This allows reducing the level of stresses transmitted to the frame 12 and to the body of the vehicle 10.

Figure 17:
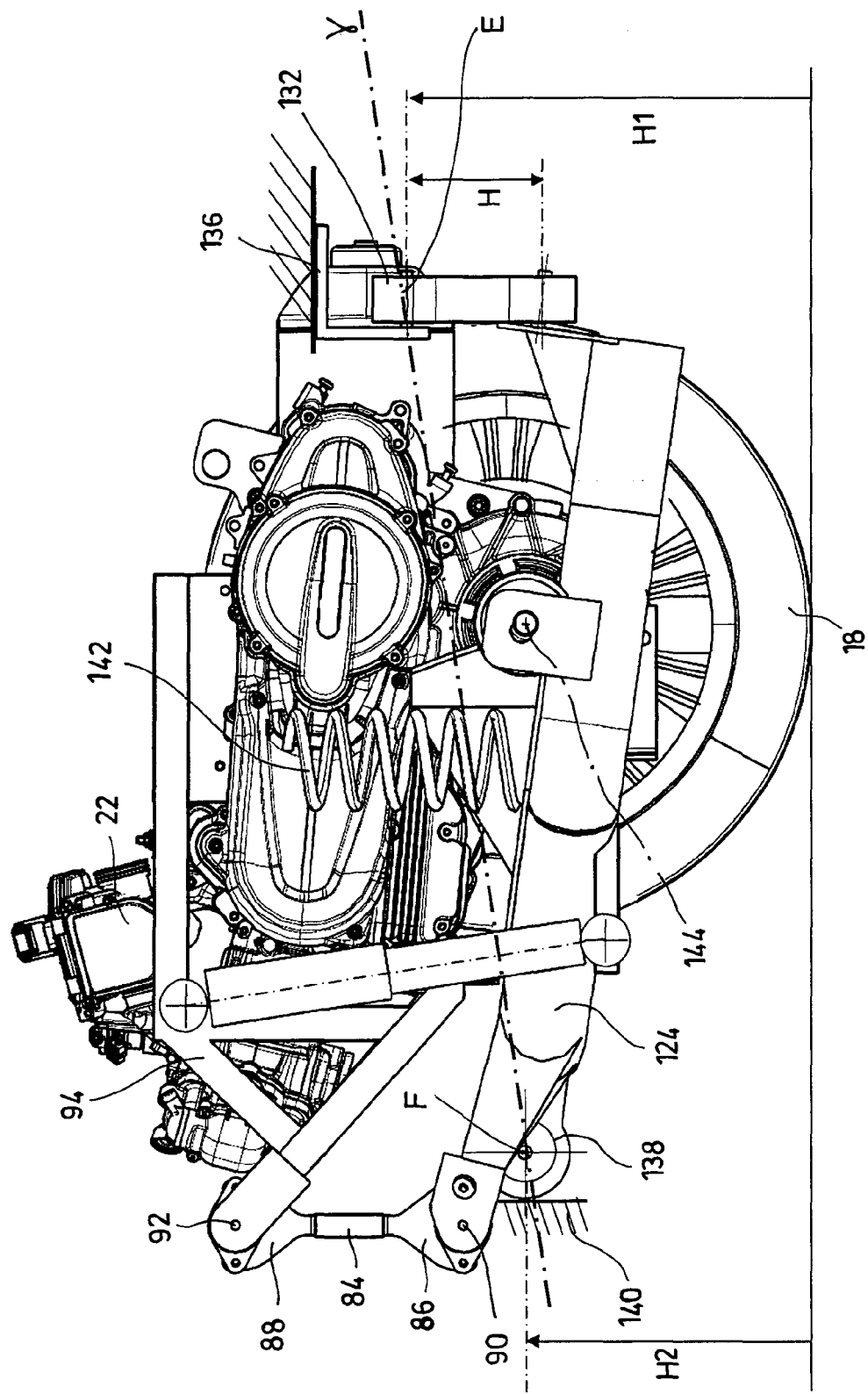

With reference to FIG. 17, it is observed how the virtual elastic centre E of the third elastic bushing 132 is positioned behind the axle 144 of the rear wheels 18 and 20, at a vertical height H1 greater than the vertical height H2 of the virtual elastic centre F of the front elastic bushing 138 of the bridge 124, such virtual elastic centre F of the front elastic bushing 138 of the bridge 124 actually coinciding with the point of constraint 68 of the rear suspension unit 28 to the frame 12. The front elastic bushing 138 of the bridge 124 is fixed to the frame 12 of the vehicle 10 by means of a bracket 140.

The axis γ alongside the virtual elastic centres E and F represents the axis around which the relative rotation motion occurs between the rear suspension unit 28 and the frame 12 of the vehicle 10. The inclination of the axis γ, according to the description, confers to the rear suspension unit 28 the self-steering characteristic, induced by the roll, in phase with the steering of the front wheels 14 and 16 the vehicle 10. As a matter of fact, when the vehicle 10 defines a curvilinear trajectory, the roll of the frame 12 causes the external wheel—with respect to the curve—to move in the front direction, with the internal wheel—with respect to the curve—receding as a consequence. The in-phase self-steering makes the vehicle 10 more under-steering and thus more stable.

The vertical elasticity of the leaf-spring-shaped flexible element 122 actually does not intervene in the roll motions of the frame 12, given that the rear suspension unit 28 may rotate around the axis γ, but it intervenes in the rebound motions, during which it works parallel with the main springs 142 of the rear suspension unit 28. This allows reducing the dimensions of such springs 142 and hence the weight and costs thereof. The rebound motions of the bridge 124 are allowed by the distance H (FIGS. 17 and 20) between the axes of the elastic bushings 128 and 132, alongside the contribution of the elasticity thereof. The distance H varies with the rebound motion of the frame 12 according to well known laws.

The rear suspension unit 28 described up to now reduces the number of fixings to the frame 12 to two, i.e. the pin of the front elastic bushing 138 of the bridge 124 and the pin of the central elastic bushing 132 of the leaf-spring-shaped flexible element 122, actually reducing the assembly times and costs. In order to reduce the weights, the leaf-spring-shaped flexible element 122 may be made of composite materials instead of harmonic steel.

In terms of eco-compatibility, it is provided for that the vehicle 10 be made of recyclable and/or reusable material. The laws in force (directive 2000/53/EC regarding vehicles out of use) actually provides for that some types of vehicles be made using components containing non-harmful and easily recyclable and/or reusable material, so as to be able to easily dispose the vehicle at the end of life thereof without damaging the environment and creating problems for the society. Though such provisions are not applied to quadricycles, it is however provided for that the vehicle 10 subject of the invention be made using highly recyclable and/or reusable and non-harmful material. In addition, it is provided for that particular assemblies be provided in such a manner that all the components be easily separable and thus be disposed in a simple and quick manner.

It has thus been observed that the four-wheeled vehicle according to the present invention attains the previously mentioned objects.

The four-wheeled vehicle of the present invention thus conceived is however susceptible to numerous modifications and variants, all falling within the same inventive concept; furthermore, all the details may be replaced by technically equivalent elements. In practice, all the materials used, as well as the shapes and dimensions, may vary depending on the technical requirements.

The invention claimed is:

1. Vehicle (10) comprising a bearing frame (12) of the tubular trestle type, two front steered wheels (14, 16), two rear wheels (18, 20) with fixed axis (144), an engine unit (22), steering means (24) through which it is possible to operate on the front wheels (14, 16), a front suspension unit (26, connecting the frame (12) to the front wheels (14, 16), a rear suspension unit (28), connecting the frame (12) to the rear wheels (18, 20), a transmission unit, interposed between the engine unit (22) and axle shafts of the rear wheels (18, 20), a seat (44) for the driver of the vehicle (10), arranged at a central position with respect to the vehicle (10), and at least two seats (44') for the passengers of the vehicle (10) adjacent to each other, arranged laterally and receded according to a predefined distance with respect to the seat (44) for the driver of the vehicle (10), characterised in that the engine unit (22) is elastically constrained with respect to the rear suspension unit (28) through at least one suspension mechanism (72, 74; 84, 90, 92), which provides a first level for filtering the stresses generated by the operation of the engine unit (22) and so that the rear suspension unit (28) is capable of supporting the overall weight of the engine unit (22), and in that the rear suspension unit (28) is elastically constrained to the frame (12) through at least one auxiliary suspension mechanism (96, 98) which, alongside the elasticity of the tyres of the rear wheels (18, 20), forms a second level for filtering the stresses generated by the operation of the engine unit (22) said suspension mechanism of the engine unit (22) comprising a pair of lateral elastic support pins (72, 74), directed according to the same axis which substantially passes through the centre of mass (70) of the engine unit (22) and arranged so as to support each about half the weight of said engine unit (22) wherein said suspension mechanism further comprises reaction rod (84) whose lower end (86) is constrained, by means of a first elastic bushing (90), to the rear suspension unit (28) of the vehicle (10), and whose upper end (88) is constrained, by means of a second elastic bushing (92), to the engine unit (22) through an adapter bracket (94), said reaction rod (84) being capable of supporting the share part of weight of the engine unit (22) not supported by the lateral elastic support pins (72, 74) and reacting to the drive torque of said engine unit (22).

2. Vehicle (10) according to claim 1, characterised in that said elastic support pins (72, 74) are constrained to the engine unit (22) respectively by means of a first pair of brackets (76, 78), arranged at the left side with respect to the centreline axis (Z-Z) of the vehicle (10), and a second pair of brackets (80, 82), arranged on the right side with respect to the centreline axis (Z-Z) of the vehicle (10) with reference to the direction of motion of said vehicle (10), the brackets (76, 80) arranged towards the outer sides of the vehicle (10) being integral with the rear suspension unit (28), while the brackets (78, 82) arranged internally towards the centreline axis (Z-Z) of the vehicle (10) being integral with the engine unit (22).

3. Vehicle (10) according to claim 1, characterised in that said auxiliary suspension mechanism comprises a front elastic bushing (96) which provides the elastic constraint between the rear suspension unit (28) and the frame (12) through a bracket (98), said auxiliary suspension mechanism also operating through the vertical elasticity of the tyres of the rear wheels (18, 20).

4. Vehicle (10) according to claim 1, characterised in that the distance (A) between the point of constraint (68) of the rear suspension unit (28) to the frame (12) and the centre of mass (70) of the engine unit (22), measured in the direction of the centreline axis (Z-Z) of the vehicle (10), is greater than the distance (B) between said centre of mass (70) and the axle (144) of the rear wheels (18, 20), also measured in the direction of the centreline axis (Z-Z) of the vehicle (10).

5. Vehicle (10) according to claim 1, characterised in that the rear suspension unit (28) is of the rigid bridge (124) type and that the front suspension unit (26) instead has an independent wheels scheme of the "McPherson" type.

6. Vehicle (10) according to claim 5, characterised in that the rear suspension unit (28) is provided with a leaf-spring-shaped flexible element (122), arranged transversely with respect to the centreline axis (Z-Z) of the vehicle (10) and arranged at the rear end of the bridge (124) of said rear suspension unit (28), said leaf-spring-shaped flexible element (122) being capable of vertically guiding and transversely constraining the bridge (124) in the respective rebound and roll motions with respect to the frame (12).

7. Vehicle (10) according to claim 6, characterised in that said leaf-spring-shaped flexible element (122) is provided, at the opposite ends thereof, with two cylindrical cavities (126) suitable to accommodate respective elastic bushings (128) for connection between said leaf-spring-shaped flexible element (122) and the bridge (124) by means of pins (130), a third elastic bushing (132), constrained to the centre of said leaf-spring-shaped flexible element (122), constraining the centreline of said leaf-spring-shaped flexible element (122) to the frame (12) by means of a bracket (136) and preventing the displacement of the frame (12) in transverse direction of said leaf-spring-shaped flexible element (122).

8. Vehicle (10) according to claim 7, characterised in that the virtual elastic centre (E) of the third elastic bushing (132) is positioned behind the axle (144) of the rear wheels (18, 20) and it is arranged at a vertical height (H1) greater than the vertical height (H2) of the virtual elastic centre (F) of a front elastic bushing (138) which fixes the bridge (124) to the frame (12) by means of a bracket (140), the pin of said front elastic bushing (138) and the pin of said third elastic bushing (132) forming the only two points for fixing the rear suspension unit (28) to the frame (12), so as to reduce the times and the costs of assembling the vehicle (10).

9. Vehicle (10) according to claim 8, characterised in that the elasticity, measured in the transverse direction (Q) with reference to the centreline axis (Z-Z) of the vehicle (10), of the assembly made up of the two elastic bushings (128) for connection between the leaf-spring-shaped flexible element (122) and the bridge (124) and the third elastic bushing (132) is equivalent to about half of the lateral elasticity of the front elastic bushing (138) of the bridge (124).

10. Vehicle (10) according to claim 1, characterised in that it comprises at least one door (34) for access to the vehicle (10), provided with a mechanism for connection to the frame (12) and with "pantograph-like" opening/closing, comprising a support arm (100), provided with a first end joint (104) with respect to the frame (12) and a second end joint (106) with respect to the door (34), and a guide arm (102), also provided with a first end joint (108) with respect to the frame (12) and a second end joint (110) with respect to the door (34).

11. Vehicle (10) according to claim 10, characterised in that the transverse section of the guide arm (102) has a smaller area with respect to the area of the transverse section of the support arm (100), given that said support arm (100) is suitable to support the weight of the door (34), while said guide arm (102) solely serves the function of univocally defining the trajectory of said door (34).

12. Vehicle (10) according to claim 10, characterised in that the frame (12) is provided, at the intersection between each door compartment and the floor of the vehicle (10), with specific tubular elements (118) folded inwards towards the centreline axis (Z-Z) of said vehicle (10), said folded tubular elements (118) forming a "discharge" which reduces the transverse distance between the seat (44) for the driver of the vehicle (10) and the door compartment, the remaining portion of the floor of the vehicle (10), due to the presence of said folded tubular elements (118), being obtained in the lower part (120) of each door (34), so as to restore the continuity of the entire floor of the vehicle (10) when the doors (34) are closed.

13. Vehicle (10) according to claim 1, characterised in that the floor or deck of the vehicle (10) is made up of a tank shaped structural element (42), made integral with the frame (12) and operating as element for supporting the driver (44) and passenger (44') seats, said tank shaped structural element (42) being configured to ensure, besides the necessary functionality and ergonomics features for the people inside the vehicle (10), also the safety measures regarding any possible shock or external impact the vehicle (10) may be subjected to.

14. Vehicle (10) according to claim 13, characterised in that said tank shaped structural element (42) comprises, made in a single piece therewith, the front wheelhouses (46, 48) for the front wheels (14, 16) and the rear wheelhouses (50, 52) for the rear wheels (18, 20), underneath said tank shaped structural element (42) there further being obtained a cavity suitable to contain the engine unit (22), the transmission unit and a possible luggage compartment for the vehicle (10).

15. Vehicle (10) according to claim 14, characterised in that said tank shaped structural element (42) is centrally provided with a raised platform (54), which forms the base for supporting the driver seat (44), on the rear edges of said tank shaped structural element (42), above said rear wheelhouses (50, 52), also respectively obtained being two further raised platforms (56, 58), which form the base for supporting the passenger seats (44').

16. Vehicle (10) according to claim 15, characterised in that the frame (12) is provided with one or more specific tubular elements (60) which are inserted in shape coupling into and underneath the cavity provided for in the raised platform (54) which forms the base for supporting the driver seat (44), thus guaranteeing the required structural rigidity of the tank shaped structural element (42).

17. Vehicle (10) according to claim 15, characterised in that the frame (12) is provided with two tubular portions (62, 64) arranged in shape coupling underneath the two raised platforms (56, 58) which form the base for supporting the passenger seats (44'), said two tubular portions (62, 64) in turn forming the base for supporting said two raised platforms (56, 58).

18. Vehicle (10) according to claim 15, characterised in that said cavity suitable to contain the engine unit (22) is provided for between the two raised platforms (56, 58) which form the base for supporting the passenger seats (44'), said engine unit (22) being positioned, in said cavity, longitudinally with respect to the vehicle (10).

19. Vehicle (10) according to claim 15, characterised in that in said cavity provided for in the raised platform (54) which forms the base for supporting the driver seat (44) there may be positioned batteries and systems for controlling the engine unit (22), said raised platform (54) thus being provided with one or more inspection ports for carrying out the maintenance of said engine unit (22).

20. Vehicle (10) according to claim 13, characterised in that said tank shaped structural element (42) is made of fibreglass or a material having similar features.

21. Vehicle (10) according to claim 1, characterised in that the engine unit (22) may be of the internal combustion engine, electric motor or hybrid engine type, i.e. with an internal combustion engine and an electric motor operatively connected to each other.

22. Vehicle (10) according to claim 1, characterised in that the transmission unit is an automatic continuously variable transmission unit (CVT) provided with a differential reduction gear-inverter unit.

23. Vehicle (10) according to claim 1, characterised in that the frame (12) is configured to be suitably covered with a closed or open type body which is provided with an opening rear door (30), a rear panel (32), having the function of covering the engine unit (22), two doors (34) for access to the vehicle (10), one for each side of said vehicle (10), and a roof (40) of the fixed or opening type, either partially or completely.

* * * * *